US008580125B2

(12) United States Patent
Clidence et al.

(10) Patent No.: US 8,580,125 B2
(45) Date of Patent: Nov. 12, 2013

(54) METHOD AND APPARATUS FOR CONTROL OF A GAS OR CHEMICAL

(75) Inventors: David A. Clidence, Carmel, IN (US); Richard E. Speece, Nashville, TN (US)

(73) Assignee: Eco Oxygen Technologies, LLC, Indianapolis, IN (US)

( * ) Notice: Subject to any disclaimer, the term of this patent is extended or adjusted under 35 U.S.C. 154(b) by 0 days.

(21) Appl. No.: 12/835,368

(22) Filed: Jul. 13, 2010

(65) Prior Publication Data

US 2011/0024362 A1 Feb. 3, 2011

Related U.S. Application Data

(60) Division of application No. 11/945,943, filed on Nov. 27, 2007, now Pat. No. 7,754,082, which is a division of application No. 11/454,368, filed on Jun. 16, 2006, now Pat. No. 7,320,749, which is a continuation-in-part of application No. 11/053,124, filed on Feb. 8, 2005, now Pat. No. 7,566,397.

(60) Provisional application No. 60/543,097, filed on Feb. 9, 2004.

(51) Int. Cl.
*C02F 1/72* (2006.01)

(52) U.S. Cl.
USPC ............ 210/758; 210/103; 210/134; 210/739

(58) Field of Classification Search
USPC ................. 210/614, 103, 134, 709, 739, 758; 700/271; 422/115, 282; 318/571, 644
See application file for complete search history.

(56) References Cited

U.S. PATENT DOCUMENTS

| | | | |
|---|---|---|---|
| 1,439,406 | A | 12/1922 | Elrod |
| 1,863,111 | A | 6/1932 | Greve |
| 1,963,354 | A | 6/1934 | Currie |
| 2,788,127 | A | 4/1957 | Davidson |
| 3,201,919 | A | 8/1965 | Long |
| 3,335,082 | A | 8/1967 | Ullrich |
| 3,484,836 | A | 12/1969 | Welch |
| 3,525,685 | A | 8/1970 | Edwards |

(Continued)

FOREIGN PATENT DOCUMENTS

| | | | |
|---|---|---|---|
| DE | 3430924 | A1 | 2/1986 |
| EP | 0 013 819 | A1 | 8/1980 |
| EP | 0 054 814 | A1 | 6/1982 |
| WO | WO 79/00350 | | 6/1979 |

OTHER PUBLICATIONS

Montgomery Watson, Stage III-Odor/Corrosion/VOC Study High Purity Oxygen Field Test, for Modifications to the Metropolitan Sewerage System presented to City of San Diego, Jul. 1994.

(Continued)

*Primary Examiner* — Nam Nguyen
*Assistant Examiner* — Paul J Durand
(74) *Attorney, Agent, or Firm* — Ice Miller LLP

(57) ABSTRACT

A method and system for control of a gas or chemical. In one embodiment, the system comprises a reactor for receipt of a fluid and the gas and/or chemical for dissolving, mixing, diffusing, or infusing the gas and/or chemical into the fluid, and a controller to control the flow of the fluid and the gas and/or chemical into the reactor. In some embodiments, the system may also monitor the operation of the system in accordance with predetermined operating conditions. In at least one embodiment, the system also comprises a gas/chemical generation system for generation of the gas and/or chemical to be introduced into the reactor.

15 Claims, 13 Drawing Sheets

(56) References Cited

U.S. PATENT DOCUMENTS 3,607,735 A 9/1971 Hover et al.
3,614,256 A 10/1971 Sieghartner
3,617,537 A 11/1971 Vermette
3,643,403 A 2/1972 Speece
3,677,936 A 7/1972 Bastiaanse
3,734,850 A 5/1973 Karr
3,737,382 A 6/1973 Fletcher et al.
3,738,620 A 6/1973 Ennis
3,756,197 A 9/1973 Buss et al.
3,758,083 A 9/1973 Palmer
3,772,187 A 11/1973 Othmer
3,778,233 A 12/1973 Blough et al.
3,779,913 A 12/1973 Martin
3,794,303 A 2/1974 Hirshon
3,804,255 A 4/1974 Speece
3,815,879 A 6/1974 Mikhailov et al.
3,826,742 A 7/1974 Kirk et al.
3,840,457 A 10/1974 Wilson
3,875,051 A 4/1975 Kovarik
3,926,588 A 12/1975 Speece
3,927,152 A 12/1975 Kyrias
3,947,359 A 3/1976 Laurie
3,953,554 A 4/1976 Loughridge
3,956,124 A 5/1976 Fast et al.
3,957,633 A 5/1976 Gatti et al.
3,959,142 A 5/1976 Dupre
3,981,273 A 9/1976 Buss
3,984,323 A 10/1976 Evens
3,992,491 A 11/1976 Ihrig et al.
4,039,437 A 8/1977 Smith et al.
4,044,720 A 8/1977 Fast
4,048,072 A 9/1977 McCullough
4,064,750 A 12/1977 Speece
4,087,262 A 5/1978 Speece
4,094,774 A 6/1978 Smith
4,102,650 A 7/1978 Spevack
4,115,258 A 9/1978 Smith et al.
4,126,544 A 11/1978 Baensch et al.
4,133,850 A 1/1979 Hauser
4,146,478 A 3/1979 Rongved
4,148,726 A 4/1979 Smith
4,157,304 A 6/1979 Molvar
4,171,263 A 10/1979 Roberts, Jr. et al.
4,179,375 A 12/1979 Smith
4,183,787 A 1/1980 Roesler et al.
4,203,841 A 5/1980 Shimizu et al.
4,210,534 A 7/1980 Molvar
4,213,923 A 7/1980 Bryson
4,224,158 A 9/1980 Molvar
4,226,717 A 10/1980 Malm
4,226,719 A 10/1980 Woltman
4,235,719 A 11/1980 Pearson
4,244,821 A 1/1981 Molvar
4,248,707 A 2/1981 Granger
4,251,365 A 2/1981 Speece
4,278,546 A 7/1981 Roesler
4,287,070 A 9/1981 Pollock
4,304,665 A 12/1981 Hines
4,344,774 A 8/1982 Skipper
4,347,143 A 8/1982 Righetti
4,350,589 A 9/1982 Stog
4,351,730 A 9/1982 Bailey et al.
4,368,121 A 1/1983 Vasiliev et al.
4,415,508 A 11/1983 Aida et al.
4,421,648 A 12/1983 Besik
4,451,213 A 5/1984 Takei et al.
4,474,713 A 10/1984 Wickoren
4,504,388 A 3/1985 Desbos et al.
4,508,492 A 4/1985 Kusakawa et al.
4,545,945 A 10/1985 Prave et al.
4,581,137 A 4/1986 Edwards
4,587,064 A 5/1986 Blum
4,648,043 A 3/1987 O'Leary
4,650,404 A 3/1987 Kusakawa
4,659,459 A 4/1987 O'Leary et al.
4,659,485 A 4/1987 Arbisi et al.
4,690,756 A 9/1987 Van Ry
4,695,378 A 9/1987 Ackman et al.
4,704,204 A 11/1987 Kaelin
4,724,086 A 2/1988 Kortmann
4,724,677 A 2/1988 Foster
4,732,682 A 3/1988 Rymal
4,749,493 A 6/1988 Hicks
4,749,527 A 6/1988 Rasmusen
4,786,419 A 11/1988 Mouratoglu et al.
4,790,355 A 12/1988 Kennedy
4,793,919 A 12/1988 McCorquodale
4,797,208 A 1/1989 Miller et al.
4,820,412 A 4/1989 Meyer-Rudolphi et al.
4,857,350 A 8/1989 Iwasaki et al.
4,863,643 A 9/1989 Cochran
4,863,644 A 9/1989 Harrington et al.
4,867,918 A 9/1989 Kiyonaga et al.
4,885,084 A 12/1989 Doyle
4,905,160 A 2/1990 Maurice et al.
4,906,359 A 3/1990 Cox, Jr.
4,911,838 A 3/1990 Tanaka
4,911,843 A 3/1990 Hunniford et al.
4,911,849 A 3/1990 Labesque et al.
4,919,814 A 4/1990 Carnahan et al.
4,930,993 A 6/1990 Han et al.
4,931,225 A 6/1990 Cheng
4,940,539 A 7/1990 Weber
4,956,080 A 9/1990 Josefik
4,961,400 A 10/1990 Lapray
4,965,022 A 10/1990 Litz
5,011,369 A 4/1991 Mine et al.
5,013,429 A 5/1991 Krofta
5,013,441 A 5/1991 Goronszy
5,045,202 A 9/1991 Stearns et al.
5,057,230 A 10/1991 Race
5,080,802 A 1/1992 Cairo, Jr. et al.
5,084,167 A 1/1992 Beard et al.
5,087,377 A 2/1992 Josefik
5,096,386 A 3/1992 Kassel
5,110,741 A 5/1992 Ohi et al.
5,116,501 A 5/1992 House
5,116,506 A 5/1992 Williamson et al.
5,118,415 A 6/1992 Weis et al.
5,133,876 A 7/1992 Tharp
5,152,888 A 10/1992 Koyama
5,160,459 A 11/1992 Guarnaschelli et al.
5,167,806 A 12/1992 Wang et al.
5,167,878 A 12/1992 Arbisi et al.
5,185,085 A 2/1993 Borgren
5,194,144 A 3/1993 Blough
5,200,080 A 4/1993 Bergman, Jr. et al.
5,211,916 A 5/1993 Cheng
5,238,253 A 8/1993 Sieghartner
5,252,229 A 10/1993 Rojey et al.
5,256,282 A 10/1993 Chang et al.
5,262,051 A 11/1993 Iwatsuka
5,264,130 A 11/1993 Etlin
5,294,340 A 3/1994 Stog
5,302,286 A 4/1994 Semprini et al.
5,314,621 A 5/1994 Rogalla
5,330,639 A 7/1994 Murphree
5,332,502 A 7/1994 Wickens et al.
5,352,369 A 10/1994 Heinig, Jr.
5,356,600 A 10/1994 Kiyonaga et al.
5,362,400 A 11/1994 Martinell
5,380,471 A 1/1995 Ban et al.
5,391,328 A 2/1995 Ott
5,403,522 A 4/1995 Von Berg
5,423,979 A 6/1995 Allen
5,437,784 A 8/1995 Meinecke et al.
5,463,176 A 10/1995 Eckert
5,463,879 A 11/1995 Jones
5,494,583 A 2/1996 Dieter
5,494,589 A 2/1996 Moorehead et al.
5,496,505 A 3/1996 Walla et al.
5,520,818 A 5/1996 Smith et al.
5,525,242 A 6/1996 Kerecz
5,543,089 A 8/1996 Pichardo

(56) References Cited

U.S. PATENT DOCUMENTS

| | | | |
|---|---|---|---|
| 5,569,416 | A | 10/1996 | Cross |
| 5,578,211 | A | 11/1996 | Dickerson |
| 5,580,463 | A | 12/1996 | Hubred |
| 5,590,551 | A | 1/1997 | Hong |
| 5,591,001 | A | 1/1997 | Ray et al. |
| 5,595,691 | A | 1/1997 | Hsu |
| 5,624,565 | A | 4/1997 | Lefevre et al. |
| 5,639,371 | A | 6/1997 | Loy et al. |
| 5,662,837 | A | 9/1997 | Saito et al. |
| 5,741,443 | A | 4/1998 | Gemza |
| 5,755,091 | A | 5/1998 | Johnson |
| 5,772,886 | A | 6/1998 | Bettle |
| 5,783,118 | A | 7/1998 | Kolaini |
| 5,784,885 | A | 7/1998 | Ishihama et al. |
| 5,785,854 | A | 7/1998 | McKinney |
| 5,798,044 | A | 8/1998 | Strohmeier et al. |
| 5,807,484 | A | 9/1998 | Couture et al. |
| 5,814,222 | A | 9/1998 | Zelenak et al. |
| 5,819,524 | A | 10/1998 | Bosley et al. |
| 5,861,095 | A | 1/1999 | Vogel et al. |
| 5,863,031 | A | 1/1999 | Veeder et al. |
| 5,874,001 | A | 2/1999 | Carter |
| 5,876,639 | A | 3/1999 | Campau |
| 5,885,466 | A | 3/1999 | Kelly |
| 5,904,851 | A | 5/1999 | Taylor et al. |
| 5,935,490 | A | 8/1999 | Archbold et al. |
| 5,948,326 | A | 9/1999 | Pate |
| 5,951,922 | A | 9/1999 | Mazzei |
| 5,968,352 | A | 10/1999 | Ditzler |
| 5,988,601 | A | 11/1999 | Burgess |
| 6,017,020 | A | 1/2000 | Baughman et al. |
| 6,032,931 | A | 3/2000 | Plunkett |
| 6,033,576 | A | 3/2000 | Russo |
| 6,036,749 | A | 3/2000 | Ribeiro et al. |
| 6,050,550 | A | 4/2000 | Burgess |
| 6,059,537 | A | 5/2000 | Cygnor |
| 6,066,193 | A | 5/2000 | Lee |
| 6,103,123 | A | 8/2000 | Gantzer |
| 6,113,675 | A | 9/2000 | Branstetter |
| 6,161,467 | A | 12/2000 | A'Hearn et al. |
| 6,223,540 | B1 | 5/2001 | Egermeier |
| 6,237,898 | B1 | 5/2001 | Lafont |
| 6,254,667 | B1 | 7/2001 | Saito et al. |
| 6,280,157 | B1 | 8/2001 | Cooper |
| 6,284,133 | B1 | 9/2001 | Schaefer et al. |
| 6,284,138 | B1 | 9/2001 | Mast |
| 6,322,055 | B1 | 11/2001 | Speece |
| 2001/0018026 | A1 | 8/2001 | Lampe et al. |

OTHER PUBLICATIONS

Robert P.G. Bowker, Gerald A. Audibert, Hemang J. Shah, and Neil A. Webster, U.S. Envir. Prot. Agency Office of Wastewater Enforcement and Compliance, Detection, Control, and Correction of Hydrogen Sulfide Corrosion in Existing Wastewater Systems, Sep. 1992.

J.M. Brisbane, M. Ogston, R. Lloyd-Smith, Oxygen Injection-A New Perspective on a Well Established Technology. presented Oct. 12, 1999 at Pipes Wagga Wagga'99.

US 4,530,803, 07/1985, Kuckens (withdrawn)

METHOD AND APPARATUS FOR CONTROL OF A GAS OR CHEMICAL

CROSS REFERENCE TO RELATED APPLICATIONS

This is a divisional patent application of U.S. patent application Ser. No. 11/945,943 filed Nov. 27, 2007 now U.S. Pat. No. 7,754,082, which is a divisional patent application of U.S. patent application Ser. No. 11/454,368 filed Jun. 16, 2006, now issued as U.S. Pat. No. 7,320,749, which is a continuation-in-part of U.S. patent application Ser. No. 11/053,124, filed Feb. 8, 2005, now issued as U.S. Pat. No. 7,566,397, which is a non-provisional patent application based on U.S. provisional patent application Ser. No. 60/543,097, filed Feb. 9, 2004, now expired.

FIELD OF THE INVENTION

This invention relates to the field of fluid treatment, and particularly to the introduction of a gas and/or chemical to the fluid to be treated.

BACKGROUND OF THE INVENTION

Raw domestic wastewater commonly generates offensive odors, especially at warmer temperatures, in collection systems and primary clarifiers at the wastewater treatment plant, combined sewer overflows, storage tanks, lagoons, and effluents in a sewage system. The reason for generation of offensive odors is that the demand for dissolved oxygen by the microbes in the wastewater greatly exceeds the rate that dissolved oxygen is absorbed into the wastewater. The main odor source at a municipal wastewater treatment plant is the effluent of the primary clarifier. This is because the raw wastewater resides in the primary clarifier for over 1 to 4 hours under anaerobic conditions. Under these anaerobic conditions, the microbes reduce sulfate to sulfide which causes the offensive odors. Thus, when the effluent spills down the 2 to 24 inches over the effluent weirs, the hydrogen sulfide is readily stripped out of solution. Consequently, many municipalities cover their primary clarifiers, pull off the foul off gas and scrub it of the offensive odors. This solution results in high capital cost, as well as high operating costs.

Even though it is widely recognized that oxygen deficiency in the wastewater is the root cause of the malodorous and corrosive condition, providing sufficient dissolved oxygen has not been possible, because the rags and stringy material in the raw wastewater quickly plug conventional gas transfer equipment. Furthermore, the low oxygen content in air (21%) makes it impossible to raise the dissolved oxygen above 9 mg per liter in wastewater at 25° C.

Furthermore, conventional aeration systems are very efficient at stripping out the volatile offensive sulfide complements. For instance, coarse bubble aerators generate 99 $ft.^3$ of off gas for each 1 $ft.^3$ of oxygen dissolved at 5% oxygen absorbed efficiency characteristic of coarse bubble aerators. Surface aerators have even greater stripping potential for sulfide. Therefore, these conventional systems cannot be used to aerate raw domestic wastewater without exacerbating the odors.

In order to prevent odor and corrosion in collection and primary clarifiers, it has been found that wastewater should be superoxygenated from about 10 mg per liter to about 60 mg per liter or higher of dissolved oxygen. There is a widespread myth that (1) it is not possible to achieve such high dissolved oxygen concentrations in raw municipal wastewater, and (2) that if such levels were achieved, they would quickly effervesce out of solution from the wastewater. High purity oxygen ("HPO") has a water saturation concentration about five times that of air (40 mg per liter at 25° C.). Furthermore, HPO is expensive, and economic considerations make it preferable to utilize an oxygen dissolving system that is highly efficient and has low unit energy consumption per ton of dissolved oxygen.

The only attempts to use high purity oxygen for odor and corrosion prevention in raw municipal wastewater for gravity sewers, primary clarifiers, collection sewage overflows, tanks and lagoons have used gaseous oxygen injection from a diffuser in the inlet piping. However, the applications of this method have resulted in only 40% oxygen absorption. This makes the process uneconomical, and creates an explosion hazard with such high purity oxygen in a confined space. It has thus been considered that only liquid alternative oxidants, such as hydrogen peroxide and nitrate salts and chlorine and ferric salts to precipitate sulfide, can be used for odor/corrosion prevention in collection systems and primary clarifiers at the treatment plant. These alternative oxidants cost over ten times as much as high purity oxygen, making them a less economic alternative, but these oxidants are an alternative that is used in the current absence of efficient superoxygenation techniques. This problem, coupled with the plugging problems of rags and strings, have presented such monumental problems that not one single installation in the United States is known to efficiently superoxygenate raw municipal wastewater prior to gravity sewers, primary clarifiers, or combined sewage overflows to a level of 10 to 60 mg per liter or higher of dissolved oxygen for odor and corrosion control.

Thus, large cities in the southern part of the United States spend considerable amounts for odor/corrosion control chemicals. For example, Los Angeles County spends nearly twenty (20) million dollars per year on the chemicals alone. Orange County California spends about 2.5 million dollars per year for odor control chemicals such as peroxide and nitrate. Some cities inject gaseous high purity oxygen into force mains, but the low efficiency of oxygen absorption considerably increases the total cost, as well as presents an explosion hazard, because the high purity oxygen bubbles immediately rise out of the wastewater and the high purity oxygen travels along the crown of the sewer and then collects at the first high point when the grade of the pipe becomes negative. This gas space also increases the head on the pump moving water through the system. Therefore, no efficient method of superoxygenating raw municipal wastewater prior to gravity sewers, primary clarifiers, or combined sewer overflows is in use in the art, resulting in the use of costly chemicals to achieve acceptable results. Therefore, a high efficiency method and apparatus for superoxygenating raw wastewater would be beneficial.

Oxygenation has long been recognized as potentially attractive in wastewater operations. However, to make an oxygenation system economically competitive, there should be commensurate savings in energy costs for dissolving the oxygen to offset the costs for the HPO supply. Early oxygenation systems were not able to achieve significant energy reductions for they consumed about half the energy needed to dissolve a unit of oxygen compared to conventional aeration systems.

Municipal wastewater treatment plants themselves can generate offensive odors—with $H_2S$ and mercaptans being perhaps the worst offenders. Odor studies identify the effluent weirs from the primary clarifier as the major source of odor generation for municipal wastewater treatment plants. The root cause for the odor lies in the long detention times of raw wastewater and sludge in the primary clarifier in the absence of D.O.

One prior art approach taken to mitigate such offensive odors at the municipal wastewater treatment plan is to cover the primary clarifier weirs, where the odor is stripped from the primary effluent as it cascades over the effluent weirs, and to withdraw the gas under the cover through ductwork and a blower. This withdrawn gas then must be passed through a caustic chlorine scrubber or biofilter where the odor is oxidized and destroyed. Treatment of the offensive gas in this manner is costly in terms of capital cost as well as the operating costs for caustic and chlorine. Because $H_2S$ is so corrosive the cover and ductwork must be made of corrosion proof material.

Another common approach to mitigating the odor at a wastewater treatment plant is to capture and treat the offensive gases so formed. However, the use of covers on the clarifier or weirs also significantly hinder maintenance. Furthermore, every pound of oxygen consumed in the primary clarifier translates to a 1:1 corresponding reduction of oxygen demand in the aeration tank. Therefore, it is desired to provide an efficient, cost effective system for removal of odors at municipal wastewater treatment plants and at clarifiers.

A major effort is underway in many cities to collect, store and treat combined sewer overflows (CSO). Such systems generally involve the collection of a relatively large volume of CSO in a short period of time and then storing the collected CSO for a protracted period of time—a period of days to weeks—while it is pumped out through a municipal wastewater treatment plant during low flow periods. The very nature of CSO is that it can be significantly polluted in the initial “flush” with BOD concentrations of 50 to over 200 mg/L.

The challenge to meet this oxygen demand for collected CSO is significant with present aeration systems. Further, some particular design considerations emerge. Aeration does not economically permit D.O. increases above 2 to 4 mg/L. In one large Midwestern city, the proposed aeration system designed to keep the stored CSO aerobic consumed from 2000 to 4000 kwhr/ton of $O_2$ dissolved under the most frequently occurring storage event, Furthermore, the electrical demand charge for the compressors to be turned on for a 30-minute interval twice per year alone is excessive.

If a storage basin receives a CSO storm event flow containing a BOD of 100 mg/L which has a deoxygenation constant, $k_1$, of 0.1 per day. The D.O. uptake for the first day in this case is 21 mg/L. Because the first day is the highest rate, it establishes the design criteria for sizing the required oxygen transfer system. For a storage basin of 100 MG, the system would require approximately a 700 HP blower for coarse bubble aeration to meet this demand. Therefore, it is desired to provide an aeration system for use with collected CSOs that does not require significant capital investment to achieve appropriate levels of D.O.

Wastewater treatment lagoons commonly are utilized for treatment of industrial and intensive animal rearing wastewaters. However, because these lagoons are commonly anaerobic and generate considerable $H_2S$, it is not unusual to require $1,000,000 to put a cover on such lagoons and treat the off-gas to mitigate odor generation.

Traditionally, aeration systems have been designed to satisfy activated sludge and aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system can meet the exceptionally high oxygen uptake rates of 300 to 500 mg/L-hr inherent in these advanced aerobic processes. It is desired to provide such an oxygenation system.

Regulations requiring that treated effluents be discharged at elevated D.O. concentrations to their receiving waters are specified in some discharge permits. Conventional aeration techniques can achieve this, but do so with by requiring prohibitively high unit energy consumption and are also limited in the D.O. that can be achieved. To increase the D.O. from 0 to 7 mg/L in water at 25° C. requires approximately 2700 kwhr/ton of D.O. added using standard aeration equipment. This is equivalent to over $200/ton of D.O. for electricity rates of $0.08/kwhr. It is therefore desired to provide an aeration system that can be utilized to treat effluents to regulated levels in an energy efficient manner.

In systems where a gas and/or chemical is to be used to treat a fluid, such as in a wastewater treatment system using dissolved oxygen to treat the wastewater, it is desirable to control the amount of fluid to be treated and the amount of gas and/or chemical to be used for such treatment. Generally, such systems are designed and operated assuming static conditions. However, in many applications, the conditions are not static. When treating wastewater near a gravity force main, for example, the amount of wastewater flowing through the sewer lines, and hence to be treated, varies significantly due to numerous factors. Therefore, it is desired to provide a system and method for treatment of a fluid with a gas and/or chemical that can accommodate the dynamic conditions associated with the application.

It is also preferable that such a fluid treatment system provide a monitoring function to ensure that proper design operations, and perhaps, optimal design operations, are achieved, and to avoid safety issues associated with the system. Such safety issues may include, for example, a build up of pressure in one or more devices caused by over-introduction of a gas into the system or under-introduction of the fluid to be treated into the system. Such a system would also save money by cutting back on the amount of gas and/or chemical required for treatment of the fluid.

BRIEF SUMMARY OF THE INVENTION

The present invention comprises a system and method for treating sewage. The system of the present invention is utilized to treat the main sewage stream or a side stream and results in high oxygen absorption in an energy efficient manner. The method of the present invention involves the use of the system of the present invention to oxygenate either the main sewage stream or a sidestream subsequently reintroduced into the main sewage stream.

In one embodiment, the system comprises a sewage inlet comprising part of the sewage system. The inlet is positioned for receipt and flow of sewage therethrough and has a first end and a second end. The system also comprises a sewage outlet which also comprises part of the sewage system. The outlet is positioned for flow and discharge of sewage therethrough. Additional components of the system include a source of high purity oxygen and an oxygenator. The source of high purity oxygen is operably connected to the sewage inlet between the first and second ends of the sewage inlet and is capable of introducing high purity oxygen into the sewage inlet. The oxygenator has an inlet and an outlet with an inverse conically shaped portion therebetween. The inlet of the oxygenator is operably connected to the second end of the sewage inlet, and the outlet of the oxygenator is operably connected to the first end of the sewage outlet. The inverse conically shaped portion of the oxygenator encourages downflow of oxygen gas including the sewage provided to the oxygenator, such that sewage discharged by the sewage outlet is oxygenated.

In another embodiment of the system of the present invention, connectors having apertures therethrough are connected to a main sewage line, and a pump is position near the first connector to pull a portion of the sewage flowing through the main sewage line into the previously described system.

According to one embodiment of the method of the present invention, a system according to the present invention is provided. Sewage is then allowed to enter the sewage inlet and oxygen gas is introduced from the source of high purity oxygen into the sewage inlet.

In another yet embodiment, the present invention comprises a system and method for treatment of a fluid with a gas and/or chemical, or a plurality of gases, a plurality of chemicals, or any combination thereof. In one embodiment, the system of the present invention includes a reactor and a controller. The reactor is a container in which the gas and/or chemical is to be dissolved, mixed, diffused, or infused, and includes a first inlet for receipt of the fluid to be treated, a second inlet for receipt of the gas and/or chemical, and an outlet through which the treated fluid leaves the reactor. The controller is operably connected to the first inlet, second inlet, and outlet of the reactor. The controller is capable of controlling and monitoring the amount of fluid and gas and/or chemical entering the reactor, and of measuring and controlling the amount of gas and/or chemical present in the treated fluid released from the reactor.

The system of the present invention may include monitoring and/or controlling devices for monitoring and controlling various operational parameters for operation of the system. Measurements that may be taken include, but are not limited to, temperature in the reactor, pressure in the reactor, the flow of fluid through the fluid inlet, the volume of fluid in the reactor, the flow of fluid from the fluid outlet, the temperature of fluid in the fluid outlet, the pressure of treated fluid in the fluid outlet, and the level of dissolved, mixed, diffused, or infused gas and/or chemical in the reactor or the fluid outlet.

The controller of the system of the present invention is capable of collecting data from the various monitoring and/or controlling devices connected to the system. The controller is also capable of comparing collected data and calculated data to desired operational ranges for such collected or calculated data. The controller is further operable to adjust one or more controlling devices to try to bring all operational parameters within the respective desired range therefor. In this manner, the system of the present invention can optimize the amount of gas and/or chemical that is dissolved, mixed, diffused, or infused into the fluid for treatment of the fluid. By making the controller further operable to shut down the system in the event that the adjustments are unsuccessful, the safety of operation of the system is further ensured. By including data storage media in the controller for retention of collected and/or calculated data, the system can be informative as to conditions occurring prior to powering down of the system, for improvement upon the set-up of the system, and/or to allow one to learn about the operation of the system. Such learning may result in changes in desired ranges, for example.

According to one method of treating a fluid with a gas and/or chemical of the present invention, a system comprising a reactor and a controller operably connected to the reactor is provided. Then, fluid is introduced into the first inlet of the reactor and the gas and/or chemical is introduced in the second inlet of the reactor. The control then measures the amount of gas and/or chemical present in the treated fluid released from the reactor through the fluid outlet. If the measured amount of gas and/or chemical present in the treated fluid is not as desired, the controller then adjusts the amount of fluid entering the reactor and/or the amount of gas and/or chemical entering the reactor.

In another method of treating a fluid with a gas and/or chemical according to the present invention, various types of data may be collected or calculated from collected data by the controller from various monitoring and controlling devices made a part of the system. Generally, such data relates to the operation of the system, and ranges are established and stored in controller for such data. In this manner, controller makes adjustments to the appropriate device(s) to try to bring the parameters within the desired ranges therefor. The controller may also log the data collected and/or calculated. In the event that the adjustments do not result in the parameters falling within the desired ranges, the controller powers down the system.

BRIEF DESCRIPTION OF THE DRAWINGS

Corresponding reference characters indicate corresponding parts throughout the several views.

DETAILED DESCRIPTION OF THE INVENTION

Figure 1:
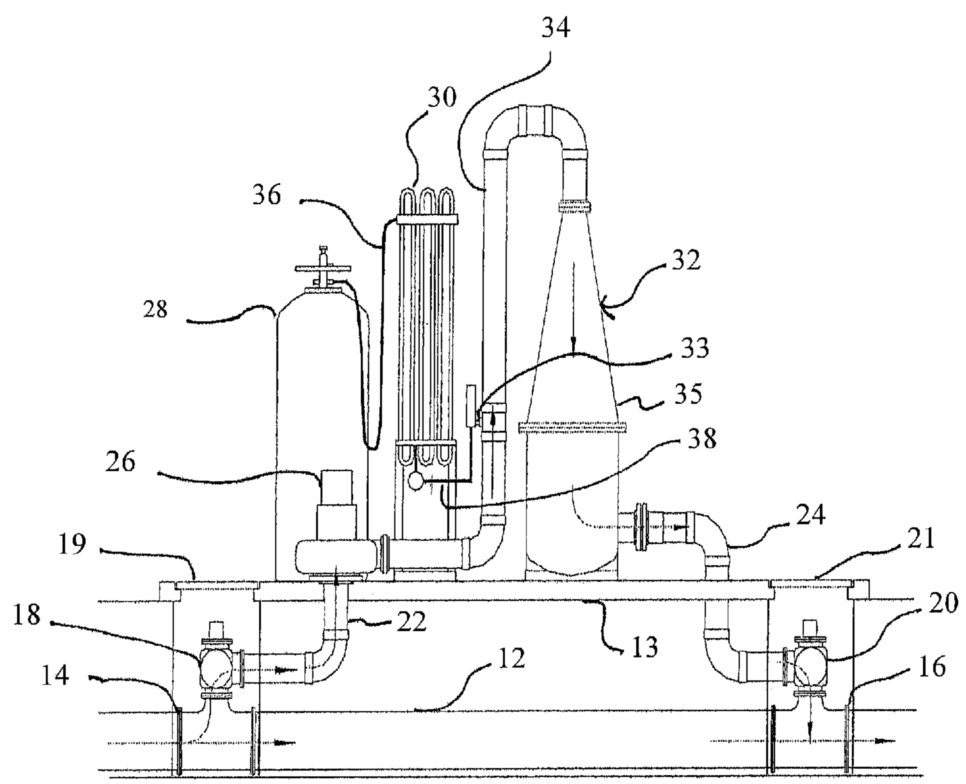
FIG. 1 shows a schematic view of one embodiment of the wastewater treatment system of the present invention.

The present invention relates to a process and apparatus that allows municipal waste treatment facilities to inhibit corrosive and malodorous chemicals from forming in its gravity collection systems, primary clarifiers, or combined sewage overflows in a sewage system by readily superoxygenating the wastewater to effective levels. In particular, the present invention utilizes a down flow bubble contact oxygenator, which has no internal edges, corners or cracks to snag rags and strings and plug the system. In one embodiment, the down flow bubble contact oxygenator, substantially similar to that disclosed in this inventor's U.S. Pat. No. 3,643,403 that is hereby incorporated by reference, is used to pump raw municipal wastewater through it, along with gaseous $O_2$ injection into the chamber to superoxygenate it to 10 mg per liter of dissolved oxygen or higher. In particular, the down flow bubble contact oxygenator is utilized in gravity sewers, primary clarifiers, or combined sewage overflows in a sewage system to superoxygenate wastewater.

According to the present invention, oxygen is completely dissolved in the wastewater in the discharge of the down flow bubble contact oxygenator and is then piped back into the sewage system. For example, by use of the present invention with a six-foot by six-foot square sewer flowing 5 ft. deep, the wastewater can be superoxygenated to 30 mg per liter dissolved oxygen, and only lose about 3 mg per liter of dissolved oxygen after flowing 3 miles in a gravity sewer due to gas exchange at the surface. Since the oxygen is in the dissolved state in the discharge of the down flow bubble contact oxygenator, there are no gaseous bubbles to come out of solution once the water is returned to the collection system or pumped into the primary clarifier. Thus, any hydrogen sulfide flowing into the superoxygenated section is microbially oxidized to sulfate in about 15 to 30 minutes once the wastewater has a positive dissolved oxygen, and no further sulfide production occurs in this three-mile stretch because the dissolved oxygen prevents any further sulfate reduction to hydrogen sulfide.

Wastewater in the interceptors flowing into the head works of a wastewater treatment plant superoxygenated in the manner described above eliminate the great odor and corrosion problems experienced at most wastewater treatment plants due to hydrogen sulfide in the incoming wastewater. Advantages are also realized in other applications of the system of the present invention at various locations in the sewage system.

The system and method of the present invention results in precluding the formation of corrosive and odorous gas at a lower cost (capital investment and energy) with highly efficient oxygen absorption and higher superoxygenated D.O. concentrations than any of the prior art systems. There are also additional benefits to the use of this superoxygenating system according to the present invention. For example, each pound of dissolved oxygen added to the stream of sewage by the system results in 1 lb, of dissolved oxygen saved in secondary treatment. Thus, corrosion control is achieved for no net overall increase in dissolved oxygen as required in secondary treatment. Another significant advantage of the system utilizing the down flow bubble contact oxygenator is the high efficiency of dissolving oxygen results in no off gas stripping of any volatile components in the wastewater. Thus, wastewater containing high concentrations of hydrogen sulfide can be superoxygenated without exacerbating the odor corrosion problem, by stripping it out of solution. Additionally, under the conditions created under the use of this system, there is no need to cover the holding tanks because there is no hydrogen sulfide in the discharge of this toxic wastewater.

Use of a down flow bubble contact aeration apparatus to superoxygenate wastewater in a sewage system, superoxygenates the water to a level which precludes the formation of malodorous and corrosive gases and chemicals. In particular, the use of a down flow bubble contact oxygenator allows superoxygenation of wastewater to an extent not possible under the prior art, greatly reducing stripping of gases and similarly resisting clogging by rags and string endemic to raw wastewater.

Referring now to FIG. 1, there is shown a schematic view of one embodiment of the wastewater treatment system of the present invention. As shown, main sewage line 12 is disposed below ground. System 10 may be disposed above or below main sewage line 12. In the embodiment of FIG. 1, system 10 is above platform 13 as would be case in use with a primary clarifier, for example. If system 10 were used with a gravity sewer, system 10 intake and discharge would be below main sewage line 12. First and second sewer connections 14 and 16, respectively, each comprise an aperture and are made to permit sewage flow to and from system 10. First valve 18 is disposed at first sewer connection 14, and second valve 20 is disposed at second sewer connection 16. First and second valves 18 and 20 are accessible through first and second manhole covers 19 and 21, respectively, on platform 13.

Both first valve 18 and second valve 20 are movable between an open position and a closed position. When first valve 18 is in the closed position, all sewage entering first sewer connection 14 is caused to flow through main sewage line 12. When first valve 18 is in the open position, a portion of sewage entering first sewer connection 14 is permitted to flow through system inlet 22. When second valve 20 is in the closed position, any sewage residing in system outlet 24 is not permitted to enter into main sewage line 12. When second valve 20 is in the open position, any sewage residing in system outlet 24 is permitted to enter into sewage line 12.

In this embodiment, system 10 includes system inlet 22, pump 26, liquid oxygen tank 28, evaporator 30, oxygenator 32, system outlet 24, liquid oxygen connector 36, oxygen gas connector 38, and oxygenator inlet 34. System inlet is connected at its first end to first valve 18, and at its second end to pump 26. Pump 26 is operable to "pull" sewage from system inlet 22 into oxygenator inlet 34. Liquid oxygen tank 28 houses liquid oxygen and evaporator 30 converts liquid oxygen into oxygen gas. Liquid oxygen connector 36 is connected at its first end to liquid oxygen tank 28 and at is second end to evaporator 30, Oxygen gas connector 38 is connected at its first end to evaporator 30 and at its second end to oxygen inlet 33 along oxygenator inlet 34. Oxygenator inlet 34 is connected at its first end to pump 26 and at its second end at oxygenator 32.

In this embodiment, oxygenator 32 is of the shape disclosed in U.S. Pat. No. 3,643,403. However, unlike the embodiments illustrated in U.S. Pat. No. 3,643,403, oxygen is not directly inserted within the interior of oxygenator 32. Instead, as explained herein, according to the present invention, oxygen is injected through oxygen inlet 33 into oxygenator inlet 34 and then into oxygenator 32. However, like the embodiments illustrated in U.S. Pat. No. 3,643,403, oxygenator 32 comprises a flow chamber of uniformly increasing flow area in a downward direction, i.e., comprises conical portion 35. Oxygenator 32 may, or may not, include a power operator impeller means as disclosed in U.S. Pat. No. 3,643,403.

During operation of system 10, first and second valves 18 and 20, respectively, are placed in the open position to allow a portion of sewage entering main sewage line 12 at first sewer connection 14 to enter system 10 and then to rejoin main sewage line 12 at second sewer connection 16. Pump 22 is operated to "pull" the portion of sewage entering through first valve 18 through system inlet 22 and to push the portion of sewage into oxygenator inlet 34. Liquid oxygen is allowed to flow (due to the pressure in liquid oxygen tank 28) from liquid oxygen tank 28 through liquid oxygen connector 36 into evaporator 30. At evaporator 30, the liquid oxygen is converted to oxygen gas and allowed to flow (due to the pressure in liquid oxygen tank 28) through oxygen gas connector 38 into oxygenator inlet 34 via oxygen inlet 33.

From the point of oxygen inlet 33 to oxygenator 32 along oxygenator inlet 34, oxygen gas injected at oxygen inlet mixes with the sewage flowing through oxygenator inlet 34. The mixture of sewage and oxygen gas enters oxygenator 32. At oxygenator 32, the bubbles of oxygen gas mixed with the sewage are drawn downward toward the bottom of oxygenator 32 and system outlet 24. Thus, the mixture of sewage flowing through system outlet 24 and second valve 20 into main sewage line 12 at second sewer connection 16 is "superoxygenated". At second sewer connection 16, the superoxygenated mixture joins the portion of sewage that was not drawn into system 10 to oxygenate the entire sewage flowing away from system 10.

It will be appreciated by those of skill in the art that the source of oxygen gas inserted into oxygenator input 34 need not be from liquid oxygen. Instead, oxygen gas itself may be used and be within the scope of the invention. For example, the combination of liquid oxygen tank 27, liquid oxygen connector 36, evaporator 30, and oxygen gas connector 38 may be replaced with a tank of oxygen gas and a connector going from the tank of oxygen gas and oxygen inlet 33.

It will also be appreciated that the system of the present invention may be useful in a variety of applications in a sewage system. While the embodiment of FIG. 1 illustrated an embodiment of the system used with a gravity main, the system may also be used with wastewater treatment plants, clarifiers, and combined sewer overflows prior to discharge into receiving waters, such as rivers.

It will be further appreciated that the system of the present invention may be used in the main sewage stream. An alternate embodiment of the present invention introduces the oxygen directly into the main stream rather than a sidestream as illustrated in FIG. 1.

The present invention provides a relatively simple technology to result in efficient dissolution of HPO into raw sewage. The performance of the oxygenation system is, of course, related to the pressure in the superoxygenation transfer vessel, which in FIG. 1 comprises oxygenator 32. For example, a backpressure of 15 psig would permit 100% $O_2$ absorption in the oxygenation system while producing a discharge D.O. of approximately 50 mg/L. The corresponding maximum discharge D.O. for a backpressure of 45 psig would be 150 mg/L. For example, a 6 ft×6 ft sewer flowing 5 ft deep at 3 ft/sec has a reaeration rate ($k_2$) of about 10/day. Therefore, if the D.O. is raised to 30 mg/L, it can be 86% retained over 3 miles and the head space oxygen content will only rise to a maximum of 22.5% $O_2$.

Superoxygenation by use of the present invention with primary clarifier influents provides a major advance in odor mitigation technology. The method of prevention of $H_2S$ formation by use of the system of the present invention is a much more comprehensive solution to municipal and industrial wastewater treatment plant odors than is gas scrubbing of the $H_2S$ after it is formed or collection of the gas after it is formed.

With regard to combined sewer overflows, oxygenation by use of the present invention is considerably more cost effective than prior art aeration systems. In addition, there are some noteworthy design objectives which can only be achieved with oxygenation by the present invention. Liquid oxygen stored on-site can be utilized to meet the exceptionally high initial oxygen demand of a storm event. Oxygenation by the present invention makes it possible to increase the D.O. in the incoming flows to over 50 mg/L. Since the rate of exchange of a dissolved gas at the interface ($k_2$) of a storage basin is related to the velocity of the water and wind and inversely proportional to the depth, very little of the superoxygenated D.O. is lost in a stagnant storage basin containing over 10 ft of water. Thus, the super oxygenated D.O. can be kept in solution until it is consumed by the microbiota.

A design was prepared using the present invention for a large Midwestern city which routed the peak CSO flow through the oxygenator of the present invention. This design raised the D.O. in the CSO to 40 mg/L as it entered the storage basin. The raising of the D.O. forestalls $H_2S$ generation by providing sufficient D.O. to meet the microbial demand for over 2 days without the need for further oxygen supplementation.

If, for some reason, the D.O. becomes depleted from a CSO storage basin with conventional aeration systems, such as may occur by waiting too long to turn on the aeration system, $H_2S$ accumulates. The accumulated $H_2S$ is generally stripped from the water into the air by conventional aeration systems. However, with use of the system of the present invention, the negligible off-gas stripping potential reduces noxious gas stripping accordingly and eliminates the problem of oxygen transfer into septic wastewater.

As previously stated herein wastewater treatment lagoons commonly are utilized for treatment of industrial and intensive animal rearing wastewaters, but because these lagoons are commonly anaerobic and generate considerable $H_2S$, it is not unusual to require $1,000,000 to put a cover on such lagoons and treat the off-gas to mitigate odor generation. In contrast a properly designed oxygenation system according to the present invention can withdraw a sidestream of the supernatant overlying the anaerobic sludge deposits, add 50 to 100 mg/L of D.O., and return it to the supernatant without disturbing the sludge layer. Using such improved technology it is possible to maintain greater than 10 mg/L of D.O. in the entire supernatant layer, with minimal loss of oxygen to the atmosphere because the aeration rate of stagnant lagoon surfaces is relatively low. Such elevated D.O. concentrations can successfully prevent $H_2S$ formation in the supernatant and also effectively oxidize the low rates of $H_2S$ evolution from the sludge layer.

Traditionally, prior art aeration systems have been designed to satisfy aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system, such as the system of the present invention, can meet the exceptionally high oxygen uptake rates of 300 to 500 mg/L-hr inherent in these advanced aerobic processes.

While some prior art systems treat sewage at various points in the sewage system, such prior art systems are not as efficient and effective as the present invention. The present invention is very efficient as over 90% of oxygen gas is absorbed into the sewage stream and very high concentrations of dissolved oxygen are achieved in the sewage discharge. Other advantages of the present invention include: (a) minimization of the stripping of dissolved nitrogen from the sewage when using HPO; and (b) superoxygenation of a side stream initially rather than attempting to aerate the whole wastewater stream. Sometimes 50 to 100 mg/L supersaturation is required to accommodate high accumulative oxygen consumption. Highly superoxygenated side streams incorporated into the HPO treatment design of the present invention proportionately reduce the footprint of oxygen transfer systems as well as allow one time high D.O. additions allowing greater zones of influence in a gravity sewer. For satisfactory prevention of $H_2S$ only a few mg/L of D.O. in excess of the amount consumed in transit need be maintained. This is especially suited to odor/corrosion issues in gravity sewers, primary clarifiers, and combined sewage overflows. For instance, a gravity main superoxygenator can be pressurized to about 40 ft by a pump to superoxygenate the raw sewage to about 70 mg/L D.O. easily and effectively while still keeping the D.O. in solution.

The present invention is also operable to achieve four important characteristics for high oxic conditions in wastewater and storm water conveyance systems. These characteristics include: (a) at least 85% (for example, 90%) efficient oxygen absorption; (b) less than 400 kwhr/ton D.O. low unit energy consumption, and at least less than 1,000 kwhr of energy consumption per ton of D.O.; (c) at least 10 mg/L D.O. levels of superoxygenation (for example, 50 to 100 mg/L D.O. superoxygenation of the sidestream); and (d) effective retention of high D.O. concentrations in solution throughout treatment.

As set forth herein, the present invention has a myriad of applications in treatment of sewage. These include: (a) combating $H_2S$ formation in gravity sewers; (b) maintenance of aerobic conditions throughout the primary clarifier for odor control; (c) maintenance of aerobic conditions in combined sewer overflow (CSO) storage tunnels and basins; and (d) achieving D.O. uptake rates of greater than 300 mg/L-hr in advanced aerobic processes with mixed liquor suspended solids (MLVSS) concentrations exceeding 20,000 mg/L volatile suspended solids (VSS).

Figure 2:
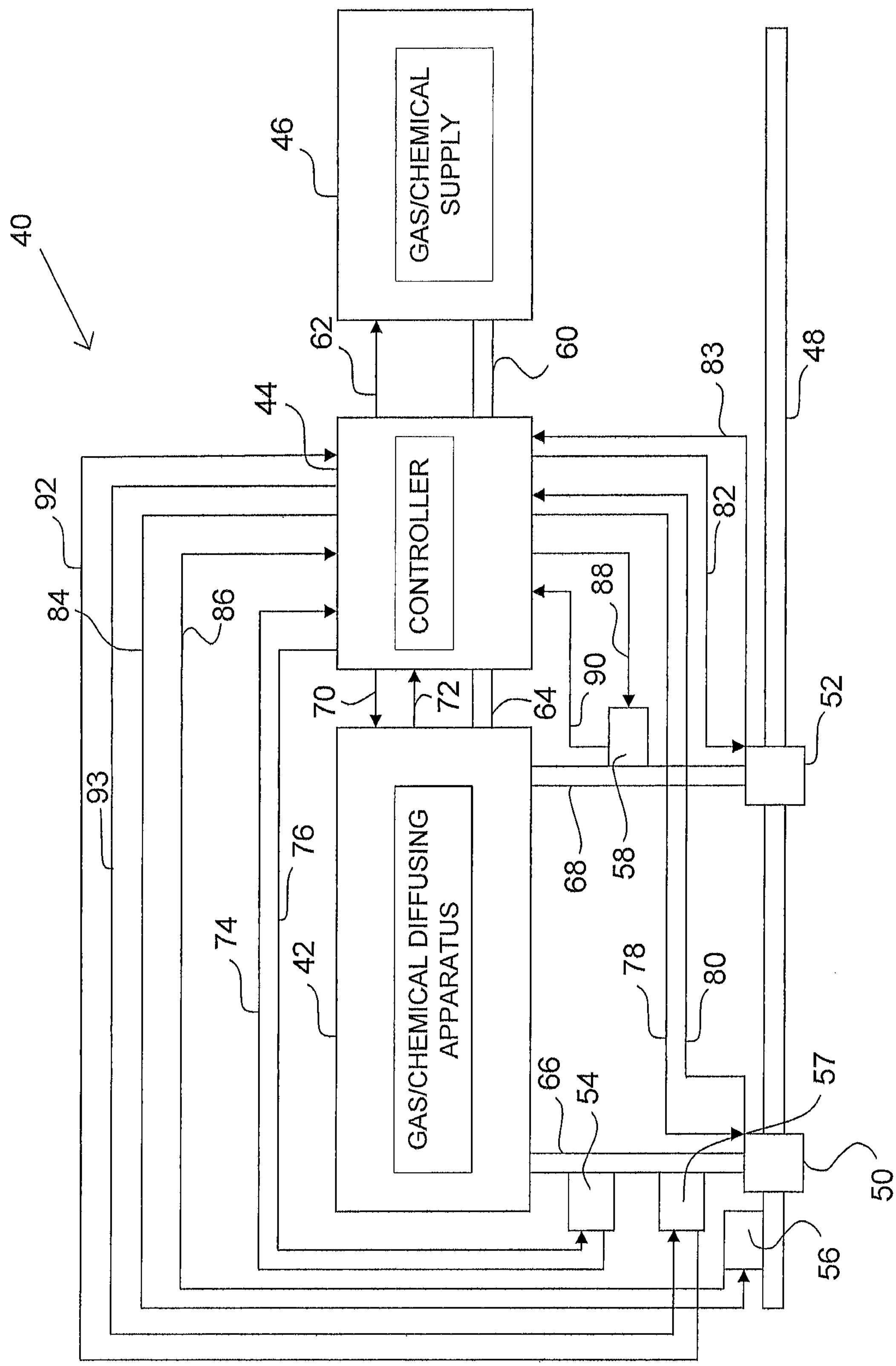
FIG. 2 shows a block diagram of one embodiment of the apparatus for gas/chemical control according to the present invention as applied to a force or gravity main.

Referring now to FIG. 2, there is shown a block diagram of one embodiment of the apparatus for gas/chemical control according to the present invention as applied to a force or gravity main. System 40 of FIG. 2 comprises gas/chemical reactor 42, controller 44, gas/chemical supply 46, and fluid line 48. System 40 also comprises first valve 50, second valve 52, pump 54, first monitoring device 56, second monitoring device 57, and third monitoring device 58.

First valve 50 is a variable position valve operable to divert some or all of the fluid in fluid line 48 into reactor 42. In the closed position of first valve 50, fluid flows in fluid line 48 without diversion into reactor 42, and in the completely open position of first valve 50, fluid is diverted into reactor 42 at a level that can be accommodated by fluid inlet 66. Because, in this embodiment, reactor 42 is positioned above fluid line 48, such diversion of fluid into reactor 42 also requires operation of pump 54 to move fluid from fluid line 48 into reactor 42. First valve 50 can be opened at various degrees between the closed position and the completely open position to control the amount of fluid diverted into reactor 42. Second valve 52 is a variable position valve operable to allow fluid flowing from reactor 42 into fluid line 48. In the closed position of second valve 52, fluid flows only within fluid line 48 and no fluid is allowed to enter fluid line 48 from reactor 42. In the completely open position of second valve 52, fluid is allowed to enter fluid line 48 from reactor 42 by the forces of gravity coupled with the operation of pump 54 which pulls fluid from fluid line 48 and pushes fluid through fluid inlet 66 into reactor 42 and into fluid outlet 68. Second valve 52 can be opened at various degrees between the open position and the completely closed position to control the amount of treated fluid from reactor 42 that enters fluid line 48. Such control of second valve 52 also results in control of the amount of time fluid remains in reactor 42, thereby effecting the amount of gas and/or chemical absorbed into the fluid in reactor 42.

The application shown in FIG. 2 is that of a force or gravity main for sewage treatment. In this application, the fluid flowing through fluid line 48 comprises sewage. When first valve 50 and second valve 52 are in their closed positions, no fluid is permitted to flow into reactor 42. Instead, all fluid flows through fluid line 48 so that the fluid contained in fluid line 48, the sewage in this example, is untreated. When first and second valves 50 and 52, respectively, are in their open positions and pump 54 is activated, some or all of the fluid in fluid line 48, the sewage in this example, is pulled into reactor 42 where the pulled fluid is treated and then allowed to reenter fluid line 48 at second valve 52.

Gas/chemical supply 46 contains the gas and/or chemical to be used to treat the fluid contained in fluid line 48. Reactor 42 dissolves, infuses, diffuses, or mixes such gas and/or chemical into the fluid by means well known in the art. In the example of application in force or gravity main, gas/chemical supply 46 contains oxygen and reactor 42 comprises a device capable of dissolving the oxygen into the sewage pulled into reactor 42. In one embodiment, reactor 42 comprises an oxygenator of the shape disclosed in U.S. Pat. No. 3,643,403 and comprises a flow chamber of uniformly increasing flow area in a downward direction, i.e., comprises a conical portion, such as conical portion 35 of FIG. 1 (see also FIG. 3B). Reactor 42 may or may not include a power operated impeller means as disclosed in U.S. Pat. No. 3,643,403.

Controller 44 comprises a means for monitoring and controlling various aspects of the fluid and the gas and/or chemical as is explained in greater detail herein. In this embodiment, controller 44 is in fluid connection with gas/chemical supply 46 and reactor 42, and is in electrical connection with gas/chemical supply 46, reactor 42, first valve 50, second valve 52, pump 54, first monitoring device 56, second monitoring device 57, and third monitoring device 58. Specifically, with regard to the fluid connections, controller 44 is in fluid connection with gas/chemical supply 46 via gas/chemical supply line 60. Controller 44 is in fluid connection with reactor 42 by gas/chemical inlet 64. Reactor 42 is in fluid connection with first valve 50 via fluid inlet 66 and is in fluid connection with second valve 52 via fluid outlet 68.

With regard to the electrical connections of controller 44 to other devices in system 40, controller 44 can control the flow of gas and/or chemical from gas/chemical supply 46 by electrical control over first electrical line 62. Controller 44 can control the flow of gas/chemical into reactor 42 and monitor certain parameters of diffusing device 42 over second and third electrical lines 70 and 72, respectively. Examples of parameters of diffusing device 42 that can be monitored by controller 44 include the temperature, pressure, and chemical composition of the contents held in diffusing device 42.

In this embodiment, controller 44 controls the operation of and collects information from pump 54 over fourth electrical line 74 and fifth electrical line 76, controls the operation of and collects information from first valve 50 over sixth electrical line 78 and seventh electrical line 80, controls the operation of and collects information from second valve 52 over eighth electrical line 82 and ninth electrical line 83, controls the operation of and collects information from first monitoring device 56 over tenth electrical line 84 and eleventh electrical line 86, controls the operation of and collection of information from second monitoring device 57 over seventeenth electrical line 92 and eighteenth electrical line 93, and controls the operation of and collection of information from third monitoring device over twelfth electrical line 88 and thirteenth electrical line 90. The types of information that controller can collect or monitor from pump 54, first valve 50, and second valve 52 depends upon the electronic capability of pump 54, first valve 50, and second valve 52, and may include current status, notice of failure, etc., as is well known in the art. In this embodiment, first monitoring device 56 measures data regarding the flow in fluid line 48 (also referred to for this embodiment as the force main flow), and second monitoring device 57 measures data regarding the flow of fluid in fluid inlet 66 (also referred to for this embodiment as the side stream flow). In this embodiment, third monitoring device 58 measures data about the temperature, pressure, and level of dissolved gas and/or chemical in fluid outlet 68.

It will be appreciated by those of skill in the art that each of first, second, and third monitoring devices 56, 57, and 58, respectively, may be representative of more than one device. For example, third monitoring device 58 may be replaced with a pressure sensor, temperature sensor, and a meter capable of measuring the level of dissolved gas and/or chemical. It will be further appreciated that other monitoring devices may be made a part of system 40. Such additional monitoring devices may measure other operational parameters, including but not limited to the temperature and pressure within reactor 42, for example.

The use of two electrical lines for connection of controller 44 to various devices in system 40 is merely illustrative of a bidirectional electrical connection between controller 44 and the respective device. It will be appreciated by those of skill in the art that various types of electrical connections that comprise one or more electrical lines or even wireless connections may be used to achieve such bidirectional communication between controller 44 and the various devices. Such alternatives are contemplated to be within the scope of the invention. It will also be appreciated by those of skill in that art that bidirectional electrical communication is not required with each device, but is beneficial to allow controller 44 to control the device and to collect data either measured by the device or indicative of the status of the device. For example, while it may only be necessary to control the operation of pump 54 with controller 44, it is advantageous for controller 44 to collect information about the status of pump 54 made available by the electronics of pump 54. As another example, while it may only be necessary to collect the data measured by first monitoring device 56, it is advantageous for controller 44 to be able to send a signal to first monitoring device 56 to activate first monitoring device 56 and to ensure that first monitoring device 56 is operating properly.

Figure 3A:
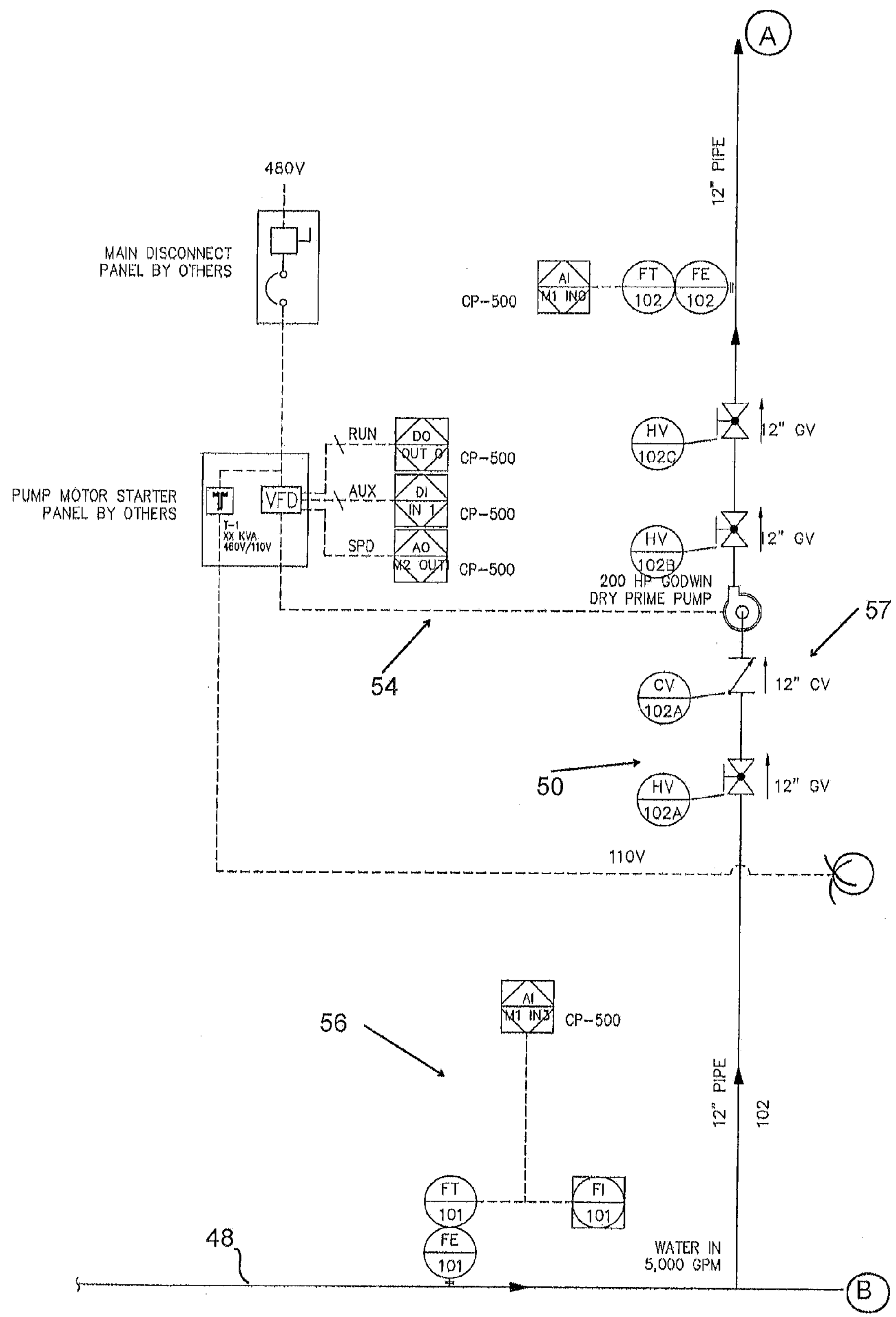
FIG. 3A, FIG. 3B, and FIG. 3C show schematic diagrams of the system of FIG. 2.
Figure 3B:
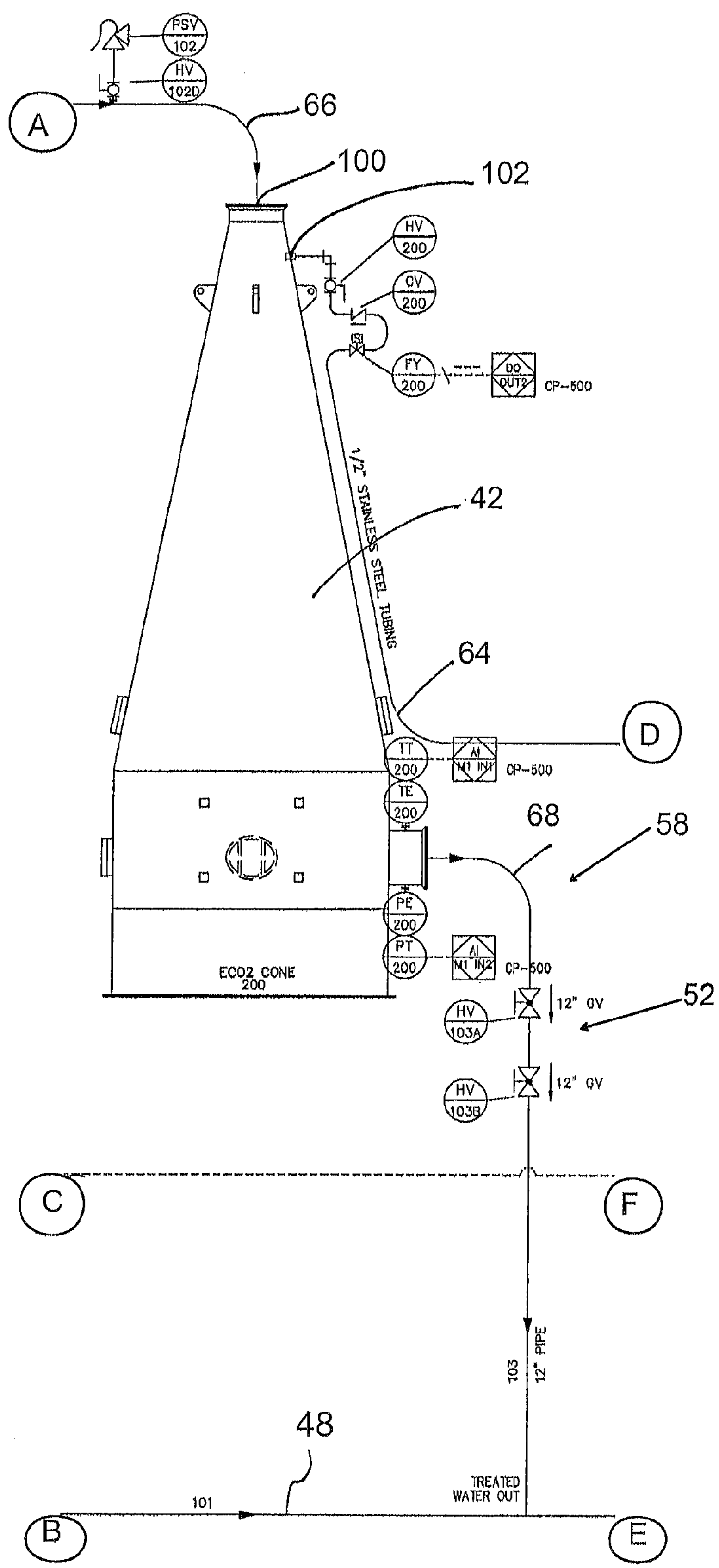
Figure 3C:
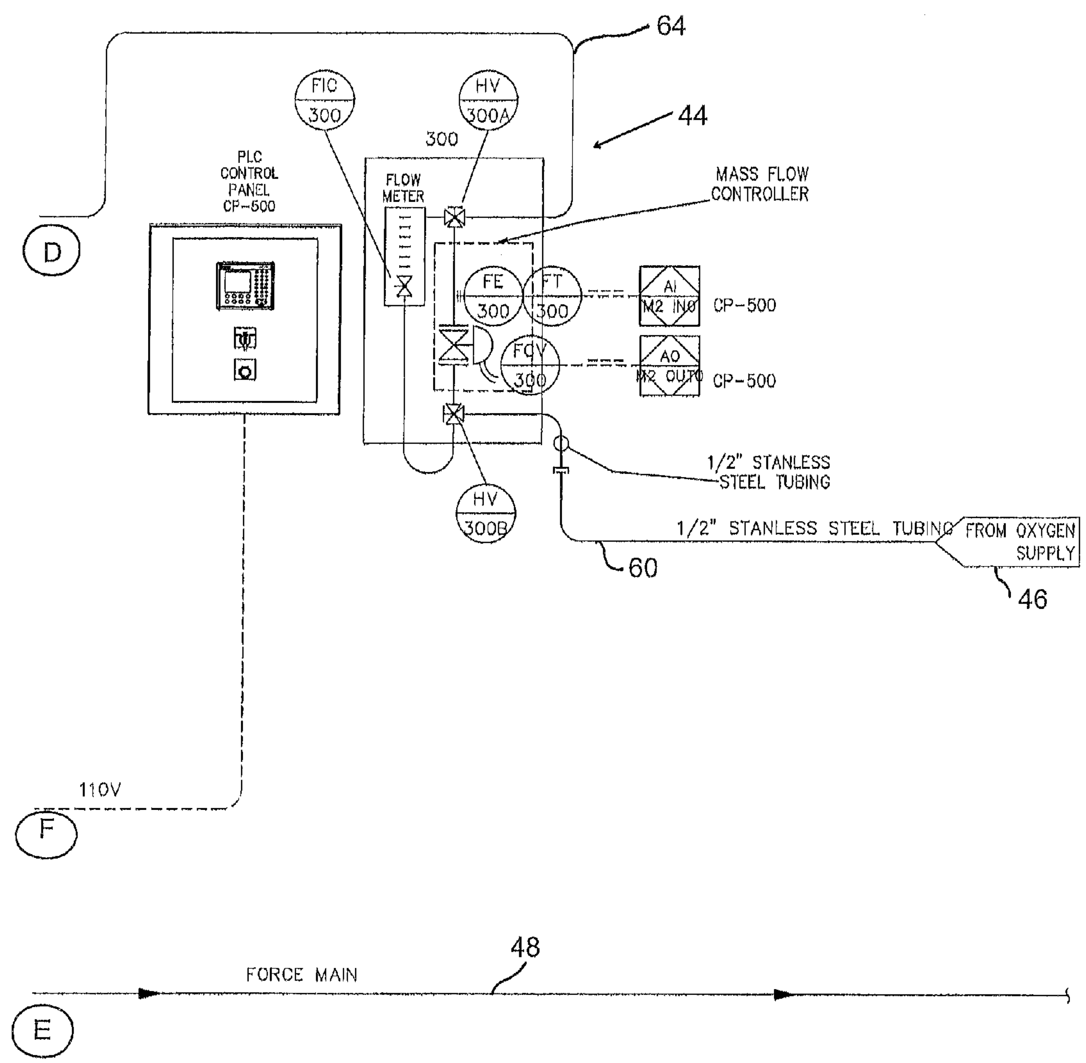
Figure 8:
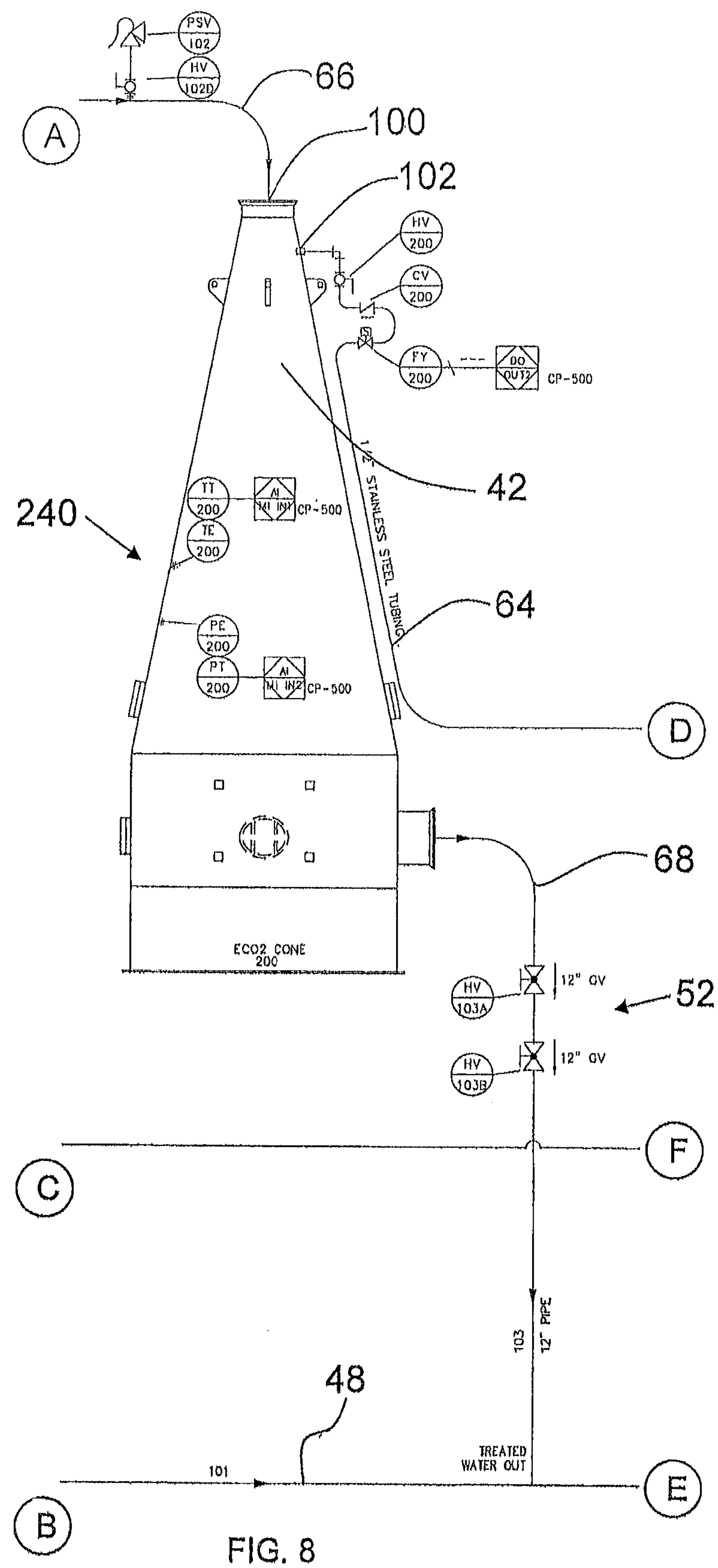
FIG. 8 shows a schematic diagram of an alternative embodiment of the system of FIG. 2.

FIG. 3A, FIG. 3B, FIG. 3C, and FIG. 8 show schematic diagrams of the system of FIG. 2. Specifically, FIG. 3A shows a schematic diagram of that portion of system 40 including fluid line 48, fluid inlet 66, first monitoring device 56, second monitoring device 57, and first valve 50. FIG. 3B shows a schematic diagram of that portion of system 40 including the continuation of fluid line 48, fluid inlet 66, fluid outlet 68, gas/chemical inlet 64, reactor 42, third monitoring device 58, and second valve 52. In this embodiment, reactor 42 further comprises fluid port 100 for receipt of fluid from fluid inlet 66 into diffusing device 42 and gas/chemical port 102 for receipt of gas/chemical from gas/chemical inlet 64 into reactor 42. FIG. 3C shows a schematic diagram of that portion of system 40 including fluid line 48, gas/chemical inlet 64, gas/chemical supply line 60, controller 44, and gas/chemical supply 46. FIG. 8 shows an alternate embodiment of that portion of system 40 wherein a third monitoring device 240 is positioned within the reactor 42. In this embodiment, the third monitoring device 240 is equivalent to the third monitoring device 58 of FIG. 3B. One embodiment of the electronics used to achieve the electrical communication of the devices shown in FIG. 2 and in FIGS. 3A, 3B, 3C, and FIG. 8 are shown in greater detail in association with FIG. 5A, FIG. 5B, FIG. 5C, and FIG. 5D hereof.

Figure 4:
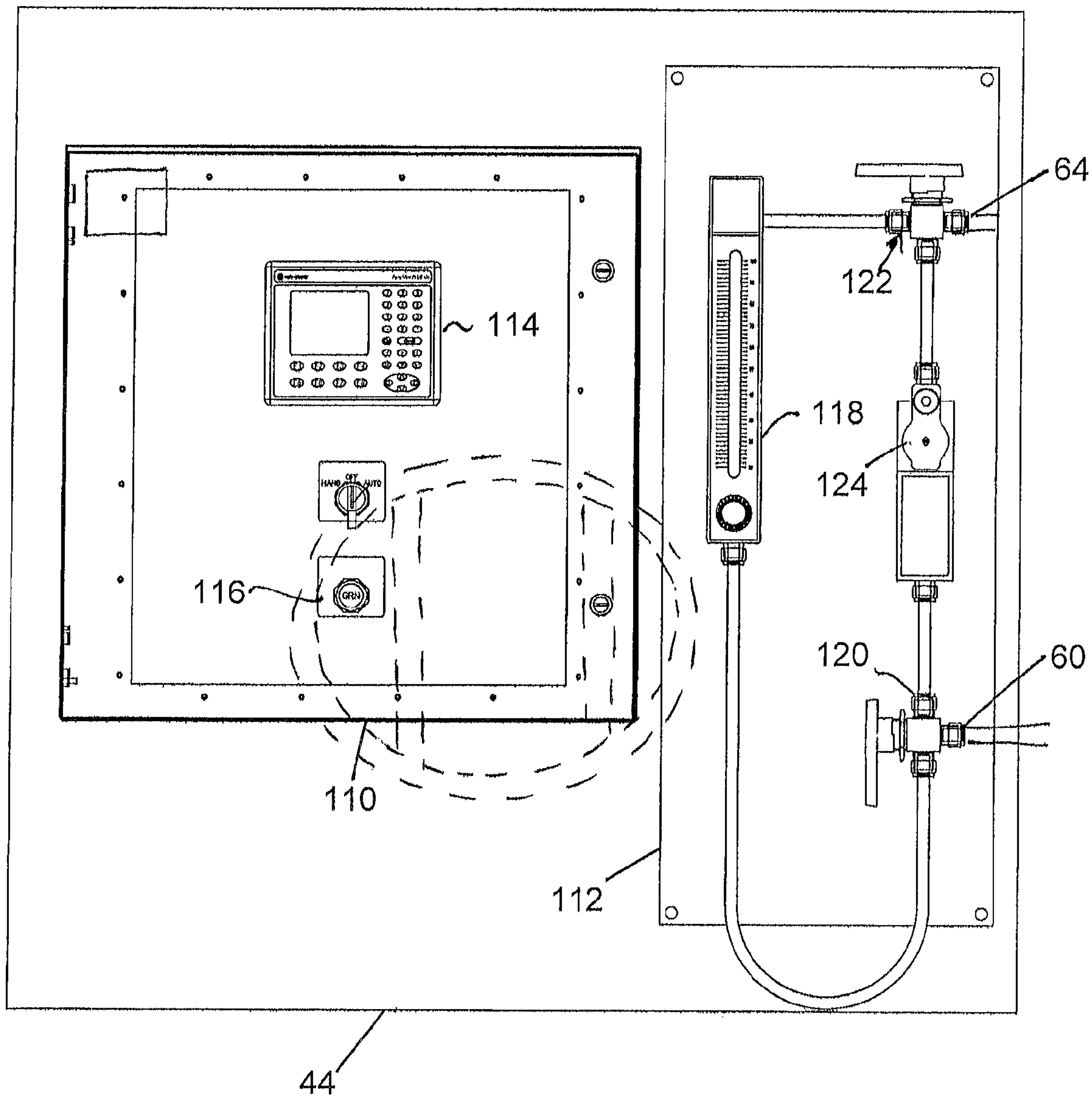
FIG. 4 shows a front view of one embodiment of the controller of the apparatus of FIG. 3A, FIG. 3B, FIG. 3C, and FIG. 8.

Referring now to FIG. 4, there is shown a front view of one embodiment of the controller of the apparatus of FIG. 3A, FIG. 3B, FIG. 3C, and FIG. 8. In this embodiment, controller 44 comprises first panel 110 and second panel 112. First panel 110 comprises an input/output device 114 and an emergency stop 116. Input/output device 114 allows an operator to enter data and to see the data entered as well as information about the operation of system 40. In one embodiment, an operator may view all the data collected by controller 44. Emergency stop 116, when activated by an operator, stops the operation controller 44 and the various devices of system 40 to which controller 44 is connected. Second panel 112 comprises first controller valve 120 for receipt of the gas and/or chemical from gas/chemical supply line 60, second controller valve 122 to control flow of gas and/or chemical from controller 44 to gas/chemical line 64, and third controller valve 124 to automatically control the flow of the gas and/or chemical from gas/chemical supply 46 (see FIG. 2) through gas/chemical supply line 60 to reactor 42 (see FIG. 2) from gas/chemical line 64. Second panel 112 also includes manual gas and/or chemical adjustment device 118 to control the flow of gas and/or chemical from gas/chemical supply 46 to reactor 42 in the event that third controller valve 124, which serves as an automatic adjustment device, is not operating or is operating improperly. In this embodiment, each third controller valve 124 and manual adjustment device 118, and the combination of third controller valve 124 and manual adjustment device 118, serve as a flow meter for control of the flow of gas and/or chemical into reactor 42.

Figure 5A:
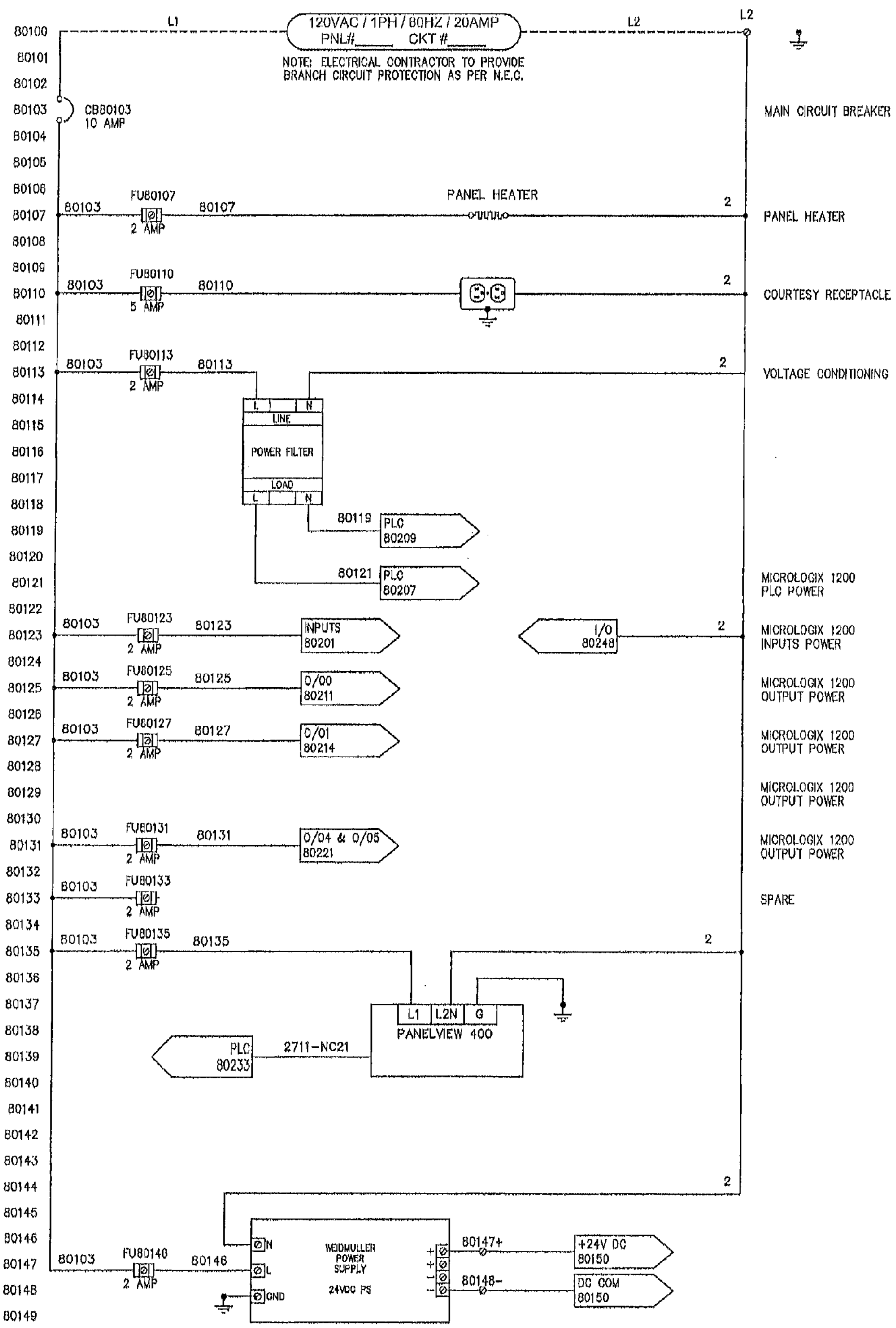
FIG. 5A, FIG. 5B, FIG. 5C, and FIG. 5D show digital schematics of the controller of the embodiment of FIG. 4.
Figure 5B:
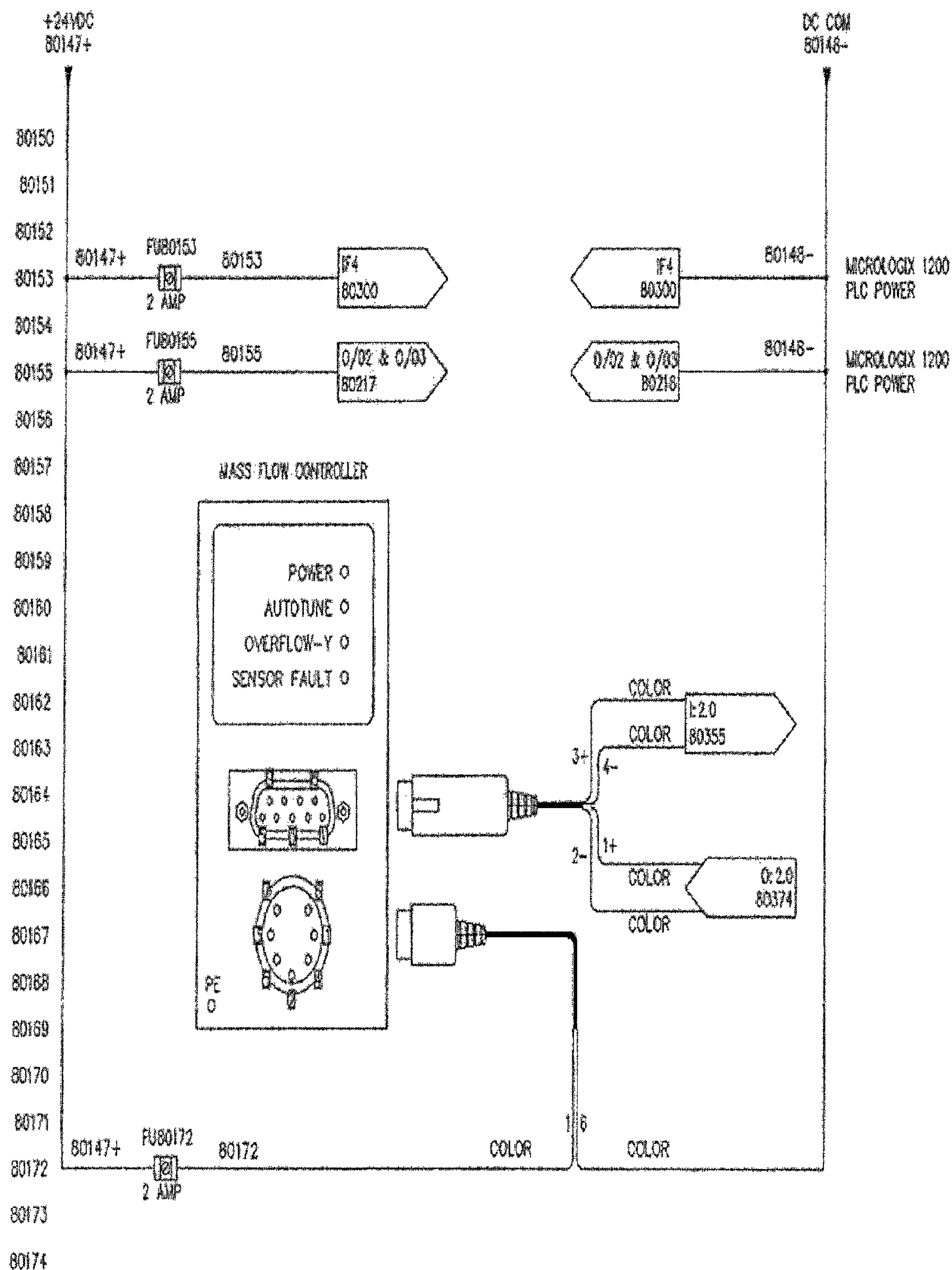
Figure 5C:
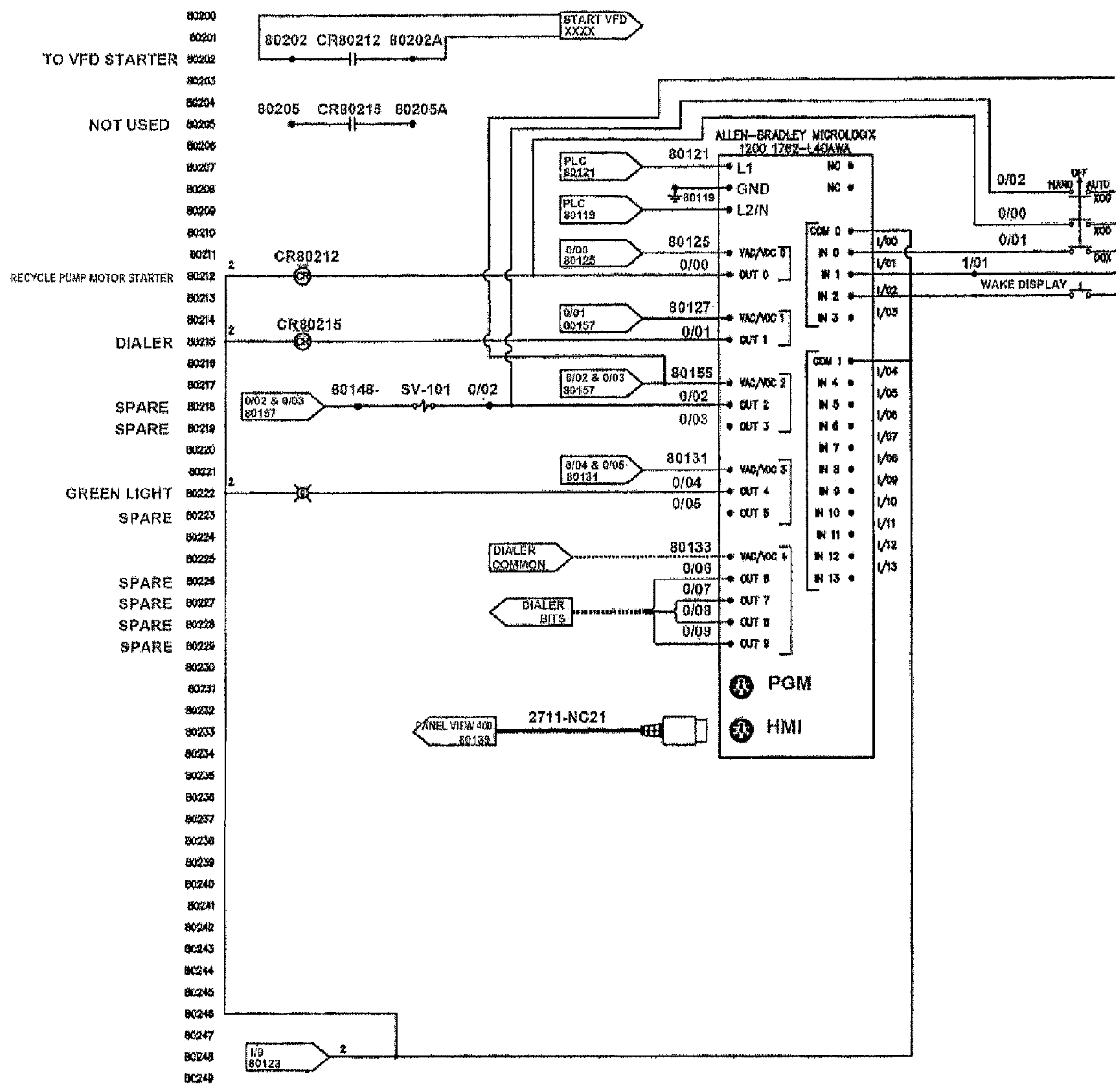
Figure 5D:
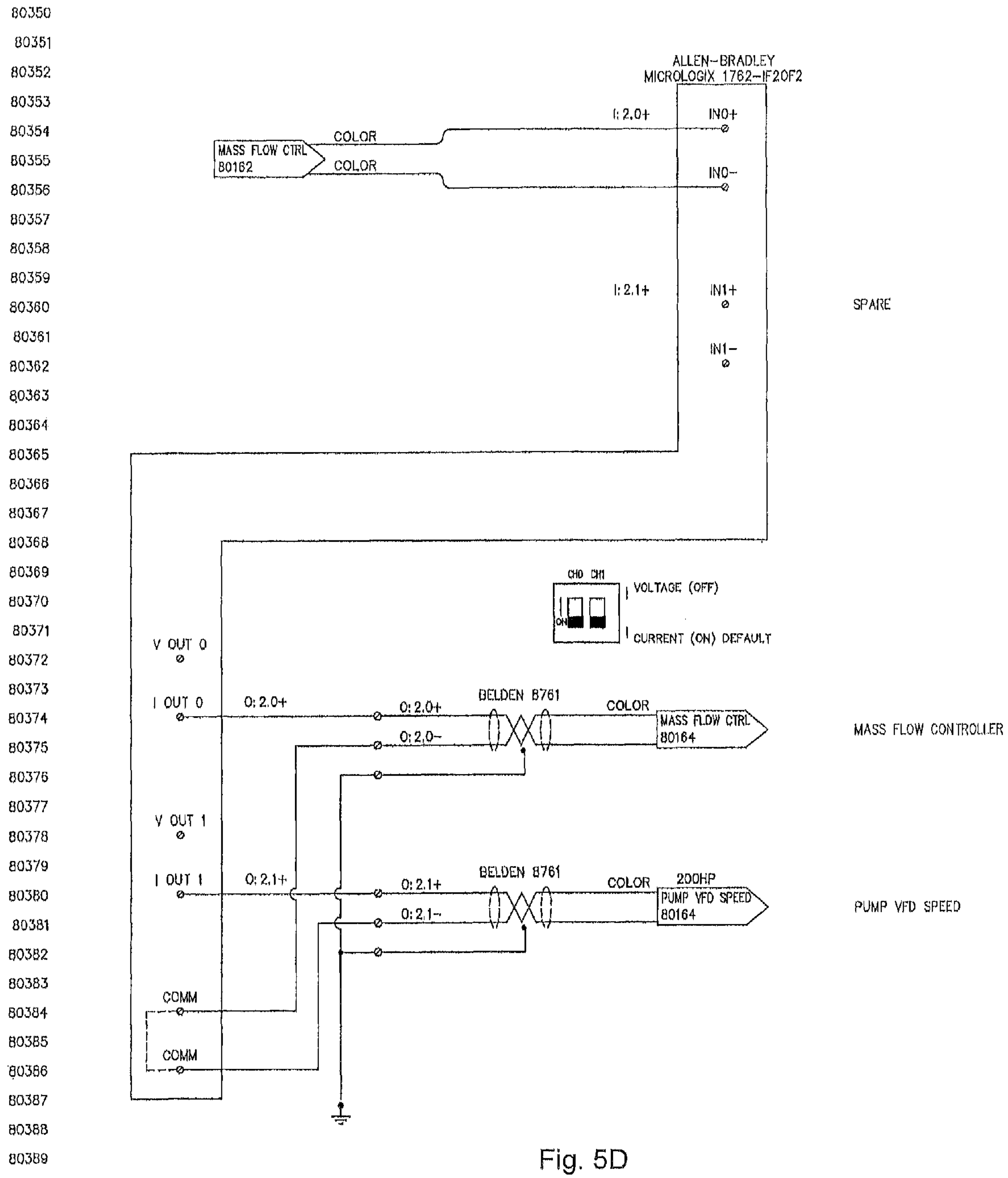

FIG. 5A, FIG. 5B, FIG. 5C, and FIG. 5D show digital schematics of the controller of the embodiment of FIG. 4. Collectively, FIG. 5A, FIG. 5B, FIG. 5C, and FIG. 5D show one embodiment of the electronics used for system 40. In this embodiment, the electronics of system 40 uses programmable logic controllers ("PLCs") for connection of controller 44 to various devices of system 40, for control of such devices, and for collection of information from such devices. In this embodiment, PLCs available from Allen-Bradley, namely, model numbers Micrologix 1200 1769-L40AWA (see FIG. 5C) and Micrologix 1762-IF20F2 (see FIG. 5D), are used for this purpose. The connections of the components of controller 44 and of devices external to the PLCs of controller 44 are illustrated in FIG. 5C and FIG. 5D. The mass flow controller portion of controller 44 is illustrated in FIG. 5B, and the power connections of the components of controller 44 are illustrated in FIG. 5A.

Figure 6:
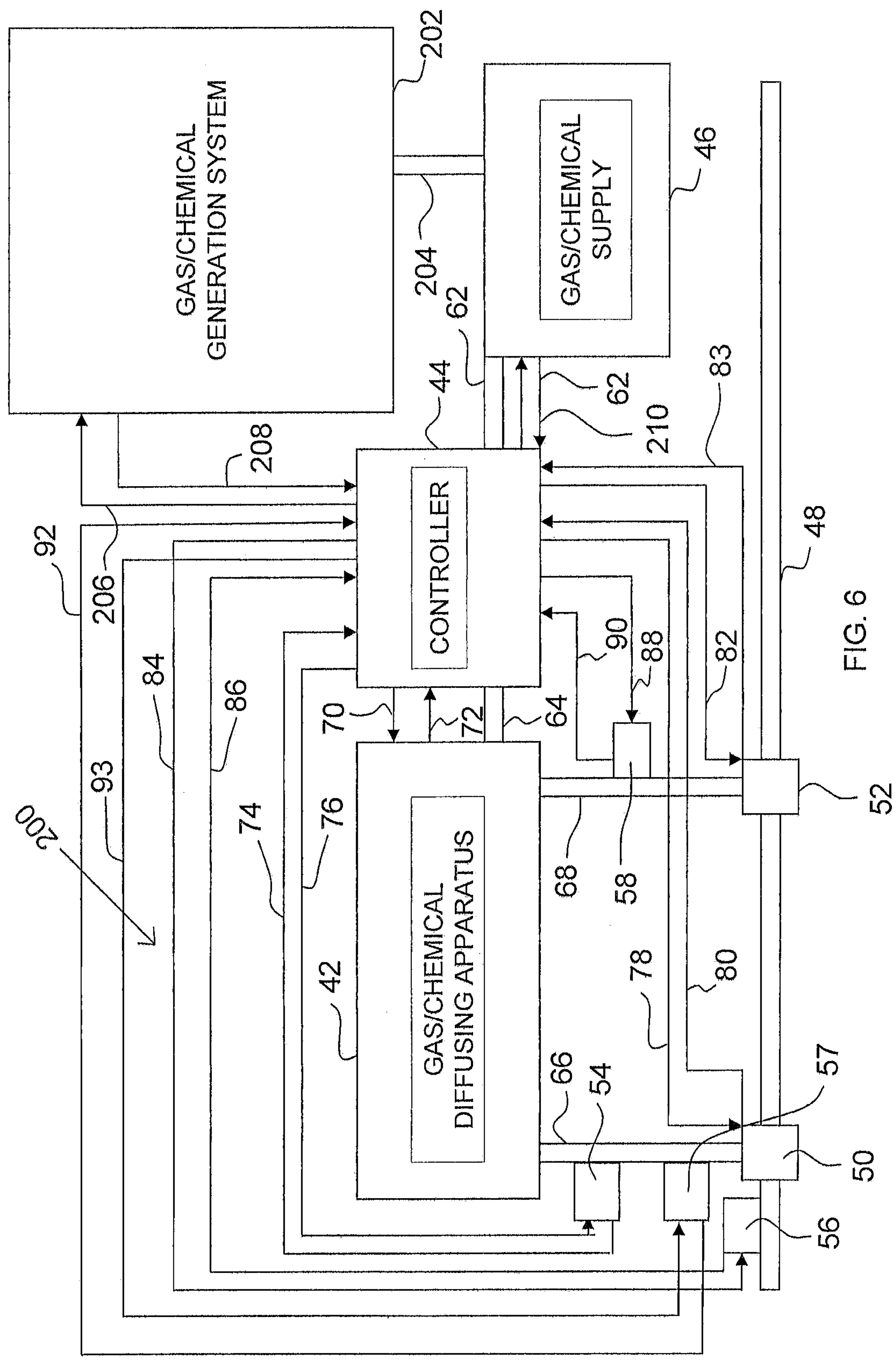
FIG. 6 shows a block diagram of another embodiment of a force or gravity main system according to the present invention having the apparatus for control of a gas and having a gas generation subsystem.

Referring now to FIG. 6, there is shown a block diagram of another embodiment of a force or gravity main system according to the present invention having the apparatus for control of a gas and having a gas generation subsystem. System 200 differs from that of system 40 of FIG. 2 by the addition of gas/chemical generation system 202, generated gas/chemical line 204, fourteenth electrical line 206, fifteenth electrical line 208, and sixteenth electrical line 210. Gas/chemical generation system 202 is a system for generation of the gas and/or chemical to be used to treat the fluid. Such systems are well known in the art.

For example, for treatment of wastewater in the force gravity main application, the gas used to treat the wastewater is oxygen. In this embodiment, gas/chemical generation system 202 is used to generate oxygen. An example of an oxygen generation system includes the mid-size generators made by Oxygen Generating Systems International of North Tonawanda, N.Y. The oxygen generation systems of Oxygen Generating Systems International usually comprise an air compressor, air dryer, air receiver tank, and oxygen generator. The air compressor compresses air and includes particulate and coalescing filters. The compressed and filter air flows from the air compressor the air dryer where the air is dried. The dried air is then sent to an air receiver tank. The filtered, dried air from the air receiving tank is then fed into a generator where substantially pure oxygen is generated from the air. The substantially pure oxygen can then be fed into a supply tank, such as gas/chemical supply 46 show in FIG. 6.

Returning now to FIG. 6, gas/chemical generation system 202 is in fluid connection with gas/chemical supply 46 via generated gas/chemical line 204. In this embodiment, gas/chemical generation system 202 is electrically connected via fourteenth and fifteenth electrical lines 206 and 208 to permit controller 44 to control, monitor, and collect information from gas/chemical generation system. In this embodiment, another electrical line, namely, sixteenth electrical line 210, is added between gas/chemical supply 46 and controller 44 to permit for monitoring and collection of information from gas/chemical supply 46. In this manner, system 200 is a closed loop system—having all operable devices connected to controller 44.

As was discussed above in association with FIG. 2, the use of two lines between devices in FIG. 6 is illustrative of bidirectional communication between the device and controller 44. It will be appreciated that it may be desirable in FIG. 2 to include bidirectional communication between controller 44 and gas/chemical supply 46, and such is contemplated to be within the scope of the invention.

Figure 7:
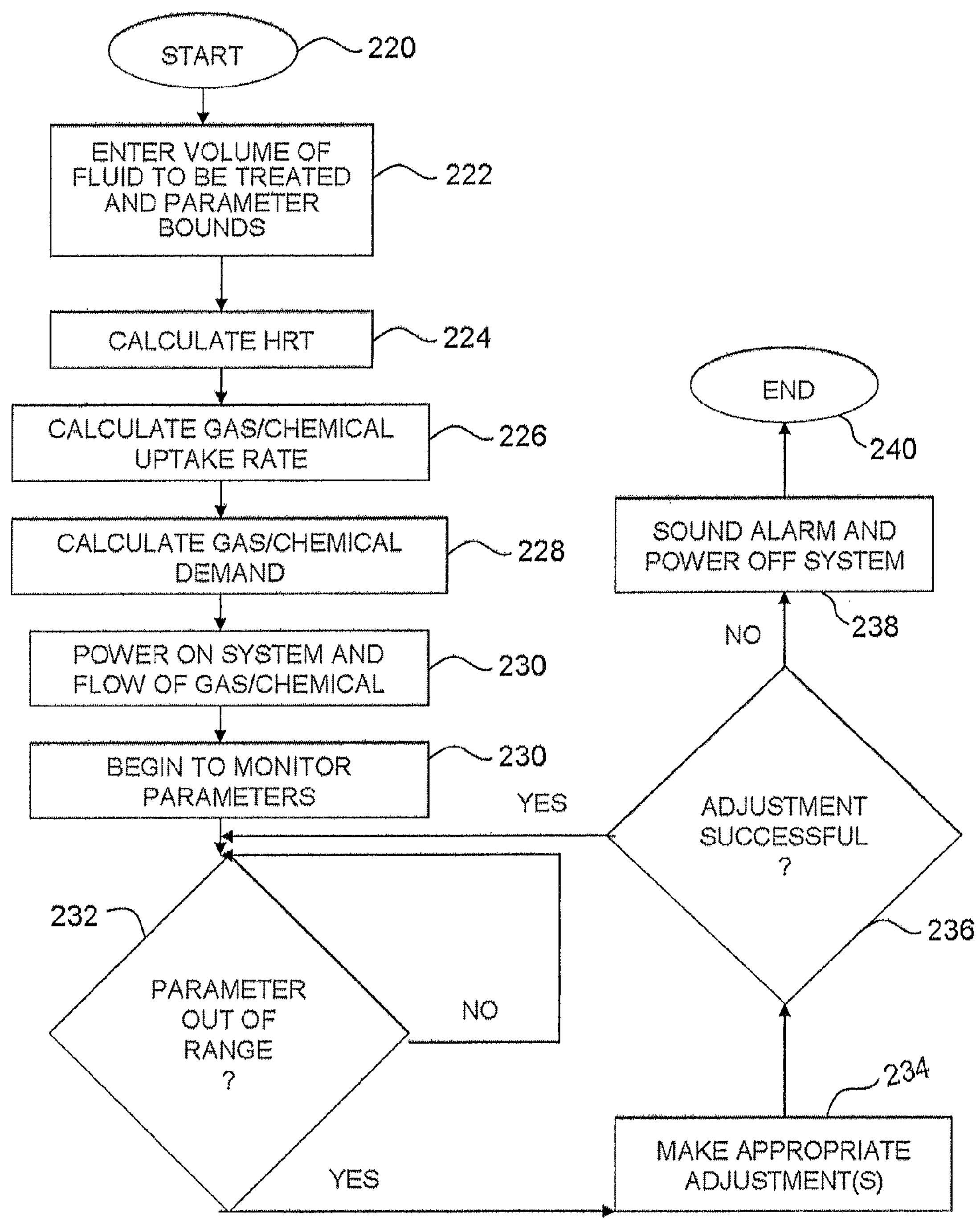
FIG. 7 shows a flowchart of one embodiment of the method of control of a gas or chemical for treatment of a fluid according to the present invention.

Turning now to the operation of system 40 of FIG. 2, FIG. 7 shows a flowchart of one embodiment of the method of control of a gas or chemical for treatment of a fluid according to the present invention. The operation of system 40 begins at step 220. Steps 222, 224, 226, and 228 are initialization steps that occur prior to powering on of system 40 in step 230. At step 222, the volume of fluid to be treated (the flow of fluid through fluid line 48 that is to be treated) is entered into controller 44 as are the bounds for various parameters to be monitored by controller 44. Entry of such data may occur manually at input/output device 114 (see FIG. 4) and/or be programmed into controller 44. In one embodiment wherein system 40 is used in a force or gravity main for treatment of wastewater, such parameters and their bounds are:

| Parameter | Lower Bounds (About) | Upper Bounds (About) |
|---|---|---|
| Temperature of contents of reactor 42 as measured by a temperature sensor included in reactor 42 or at third monitoring device 58 | 0° C. | 50° C. |
| Pressure of contents of reactor 42 as measured by a pressure sensor included in reactor 42 or at third monitoring device 58 | 0 psi | 100 psi |
| Side stream flow at second monitoring device 57 | 0 gpm | 10,000 gpm |
| Flow from gas/chemical supply line 60 as measured by flow meter (118 and/or 124) | 0 scfm | 50 scfm |
| Flow from gas/chemical inlet 64 as measured by a sensor placed along gas/chemical inlet 64 | 0 scfm | 50 scfm |
| Level of dissolved gas/chemical (in this embodiment, dissolved oxygen) from third monitoring device 58 | 0 mg/L | 200 ml/L |
| Gas/chemical absorption efficiency (percent of gas/chemical metered into reactor 42 that is actually dissolved, and is calculated by dividing the level of dissolved gas/chemical by the flow rate at gas/chemical inlet 64) | 0% | 98% |
| Force main flow measured by first monitoring device 56 | 0 gpm | 50,000 gpm |

At step 224, the hydraulic retention time ("HRT") of the fluid in reactor 42 is calculated. HRT is calculated by dividing the volume entered in step 222 by the fluid flow rate through line 48.

The gas/chemical uptake rate is determined at step 226 based on the temperature of the fluid in reactor 42 or as measured by third monitoring device 58 (as such information is collected by controller 44). In one embodiment of the example of use in a force or gravity main for wastewater treatment, if the temperature of the fluid measured in reactor 42 (or as measured by third monitoring device 58) is from about 0° C. to about 15° C., then the oxygen uptake rate is set at about 5 mg/L/hr; if the measured temperature is from above about 15° C. to about 34° C., then the oxygen uptake rate is set at about 10 mg/L/hr; and if the measured temperature is greater than from about 34° C., then the oxygen uptake rate is set at about 15 mg/L/hr. Such rates are generally based on prior measurements or experience, or on desired levels, and may be determined based on a table or, for greater precision, in accordance with an appropriate equation.

At step 228, the gas/chemical demand is calculated. The gas/chemical demand is calculated by multiplying the HRT by the gas/chemical uptake rate. At step 230, controller 44 activates various devices to which it is electrically connected. In one embodiment, controller 44:

(a) places first valve 50 in its second position, places second valve 52 is its second position, and activates pump 54 to allow fluid to flow from fluid line 48 through fluid port 100 into reactor 42;

(b) activates gas/chemical supply 46, sets flow meter 118 and/or 124 to the calculated gas/chemical demand, and opens first controller valve 120 and second controller valve 122 to permit the gas and/or chemical from gas/chemical supply 46 to flow through gas/chemical supply line 60 into gas/chemical inlet 64 and through gas/chemical port 102 into reactor 42; and (c) activates first, second, and third monitoring devices 56, 57, and 58, respectively, to enable controller 42 to collect data from first, second, and third monitoring devices 56, 57, and 58, respectively. At the conclusion of step 230, system 40 is operational to treat the fluid with the gas and/or chemical in reactor 42.

At step 230, controller 42 begins to monitor various parameters to ensure proper and safe operation of system 40. At step 232, each of the parameters is compared to the upper and lower bounds established for that parameter. Ideally, such comparison should be simultaneous, and or near simultaneous, so that not significant time elapses in making all the comparison necessary.

If it is determined at step 232 that all of the parameters are within the specified range for that parameter, controller 44 returns to step 232. If, on the other hand, one or more of the parameters is out of its specified range, the controller proceeds to make appropriate system adjustments in step 234. Specific adjustments for various parameters are discussed later herein. At step 236, controller 44 looks at appropriate data to ascertain whether the adjustment(s) made were successful, i.e., to determine if all parameters are within the specified range for that parameter. If all parameters are in the specified ranges, controller 44 returns to step 232. If, on the other hand, all parameters are not within the specified ranges, controller 44 proceeds to step 238. At step 238, controller 44 issues an alarm and powers off the system. The issuance of the alarm by controller 44 may comprise a visual and/or an audio alarm, a computer message, or any other alarming device well known in the art. The process of powering off system 40 in step 238 includes: (a) turning off pump 54 and placing first and second valves 50 and 52, respectively, in their closed positions to prohibit the flow of fluid from fluid line 48 into reactor 42; (b) closing first controller valve 120 and second controller valve 122 and deactivating gas/chemical supply 46 to prohibit the gas and/or chemical from gas/chemical supply 46 from flowing into reactor 42; and (c) optionally, deactivating first, second, and third monitoring devices 56, 57, and 58, respectively. At step 240, the monitoring of system 40 is illustrated to end.

With respect to steps 232, 234, 236, 238, and 240, immediately following are some examples of the handling of parameters monitored by controller 44. Pump 54 is monitored by controller 44 to ensure operation in accordance with design operating conditions. Specifically, the side stream flow at pump 54 is monitored by second monitoring device 57, and if it is determined at step 232 that the measured side stream flow exceed the specified bounds therefor, controller 44 adjusts pump 54 at step 234 to try to bring the side stream flow within specified tolerances. If it is determined at step 236 that the side stream flow, or any other parameter, is out of tolerances, then controller 44 proceeds to step 238 to issue an alarm and power down system 40.

The flow of gas and/or chemical through controller 44 is measured to ensure performance in accordance with predetermined design operating conditions. Specifically, at step 232, the flow rate at gas/chemical supply line 60 and/or at gas/chemical inlet 64 is compared by controller 44 to the specified range(s) therefor. If it is determined at step 232 that the flow exceeds the specified range, at step 234, controller 44 adjusts flow meter 118 and/or 124 to attempt to bring the flow of gas and/or chemical within the specified range. If it is determined at step 236 that the flow of gas and/or chemical is still outside tolerances, or if any other parameter is outside of that parameter's tolerances, then, at step 238, controller 44 proceeds to issue an alarm and power down system 40.

The level of dissolved gas and/or chemical is monitored to ensure operating performance in accordance with predetermined design operating conditions. The level of dissolved gas and/or chemical is measured at third monitoring device 58. If at step 232, it is determined that the measured level of dissolved gas and/or chemical exceeds the specified tolerances, then controller 44 at step 234 adjusts flow meter 118 and/or 124, and/or adjusts first valve 50 and/or second valve 52 (to adjust the amount of time fluid is retained in reactor 42) to try to bring the level of dissolved gas and/or chemical into specified tolerances. If it is determined at step 239 that the level of gas and/or chemical is still outside tolerances, or if any other parameter is outside of that parameter's specified range, then controller 44, at step 238, proceeds to issue and alarm and power down system 40.

With regard to the measurement of dissolved gas and/or chemical, it will be appreciated that the measurement and adjustments made in response to the measurement provides a dynamic feedback parameter for control of the gas and/or chemical injection into reactor 42, without regard to whether the level of dissolved gas and/or chemical exceeds the specified tolerances. For example, it is generally desired to maintain a preferred level of dissolved gas and/or chemical in reactor 42, and controller 44 can be used to increase or decrease the rate of injection of gas and/or chemical into reactor 42 to maintain such a desired level.

The gas/chemical dissolution rate is the amount of gas and/or chemical dissolved by reactor 42. The gas/chemical dissolution rate is calculated and monitored by controller 44 to ensure operating performance in accordance with predetermined design operating conditions. The calculation of the gas/chemical dissolution rate is made using standard gas transfer equations, and involves the multiplication of the measured dissolved gas/chemical value, gas transfer coefficient, and side stream flow rate to show the amount of gas and/or chemical dissolved in a specified time period. If the gas/chemical dissolution rate is determined in step 232 to be out of the specified tolerances, controller 44 may, in step 234, adjust the feedrate of the gas and/or chemical with flow meter 118 and/or 124, and/or adjust first valve 50 and/or second valve 52 (to control the retention time in reactor 42) to resolve the issue. If it is determined at step 236 that the gas/chemical dissolution rate is still out of tolerances, or any other parameter is out of its specified tolerances, controller 44 proceeds to step 238 to issue and alarm and to power off system 40.

The gas/chemical absorption efficiency is the percent of gas and/or chemical metered into reactor 40 that is dissolved into the fluid in reactor 42, and therefore is measured by examining the level of diffused gas/chemical in reactor and measuring the gas and/or chemical flow rate at flow meter 118 and/or 124. In the event it is determined at step 232 that the absorption efficient is out of specified tolerances, controller 44, at step 234 adjusts the feedrate of the gas and/or chemical with flow meter 118 and/or 124. If it determined at step 236 that the absorption efficiency is still out of tolerances, or any other parameter is out of its specified tolerances, controller 44 proceeds to step 238 to issue an alarm and power down system 40.

Pressure and temperature within reactor 42 or as measured by third monitoring device 58 are monitored to ensure operating performance in accordance with predetermined design operating conditions. If it is determined by controller 44 at step 232 that either pressure or temperature are out of the desired respective tolerances, controller 44, at step 234, adjusts the pressure in reactor 42 by adjusting first valve 50 and/or second valve 52. If controller 44 determines at step 236 that pressure or temperature, or any other parameter, is outside of the respective tolerances, then controller 44 proceeds to step 238 to issue and alarm and to power down system 40.

The measurement of side stream flow by second monitoring device 57 is also desired for reasons other than maintaining the appropriate introduction of gas and/or chemical into reactor 42. If controller 44 determines that there is no or substantially no flow in the side stream by measurement with second monitoring device 57, controller 44 may proceed to power down system 40 or to restrict the introduction of gas and/or chemical into system 40 to avoid the accumulation of gas and/or chemical either in reactor 42 or into fluid line 48 where the gas and/or chemical could pose a safety hazard. In the embodiment of system 40 applied in a force or gravity main, such low side stream condition could also be accommodated by recycling the reactor 42 effluent back into the influent by leaving first valve 50 is its second position, and placing second valve 52 in a closed position.

With regard to the operation of system 200 of FIG. 6, the same process may be used as is used in connection with system 40 of FIG. 2. In addition, controller 44 may control the generation of gas and/or chemical by gas/chemical generation system 202, and to ensure that enough gas and/or chemical is present in gas/chemical supply 46.

While the example discussed above in association with FIG. 2, FIG. 3A, FIG. 3B, FIG. 3C, FIG. 4, FIG. 5A, FIG. 5B, FIG. 5C, FIG. 5D, FIG. 6, and FIG. 7 is a force or gravity main water treatment application, it will be appreciated by those of skill in the art that other applications for the dissolution of a gas and/or chemical into a fluid for treatment of the fluid are contemplated to be within the scope of the invention. For example, the apparatus and method of the present invention may be used in systems to control hydrogen gas for saturating unsaturated fats and oils, for hydrogenation of coal conversion products, for the introduction of ozone for water treatment, for introduction of methane gas for methanotrophic bacteria bioremediating trichloroethylene contamination in ground water, for stripping dissolved nitrogen from water used in aquaculture by injecting oxygen gas, for treating water or wastewater with the oxygen contained in air, and for treating wastewater with oxygen together with a chemical such as chlorine, peroxide, or nitrate.

It will also be appreciated that the prior art systems for the dissolution of a gas and/or chemical into a fluid for treatment of the fluid do not completely dissolve, mix, diffuse, or infuse the gas and/or chemical before it is discharged into the fluid line or receiving tank. The present invention completely dissolves, mixes, diffuses, or infuses the gas and/or chemical prior to discharge, and provides control over the level of gas and/or chemical dissolved, mixed, diffused, or infused. In addition, the present invention incorporates dynamic feedback control for control of gas and/or chemical injection to match the demand for the gas and/or chemical into the system for the desired results.

Further, because controller 44 is in communication with various devices for the collection of data from such devices and for the control of such devices, controller 44 may retain in data storage media the data collected, data representative of status of the devices as controlled by controller 44 (open, closed, etc.), the parametric data, the established tolerances for the parameters, and/or the calculated data. The retention of such data is beneficial for several reasons. Examination of the data by means well known in the art may be informative as to conditions occurring prior to powering down of the system, to improve upon the set-up of the system, and/or to learn about the operation of the system. Such learning may result in changes in tolerances, for example.

It will be further appreciated that the system and method of the present invention accommodate changes in demand for the supply of the gas and/or chemical to the reactor as the system's operating parameters change. The ability to accommodate such changes assists to ensure that the system is operating optimally under the changing circumstances. In application for wastewater treatment, the system assists to avoid the odor and corrosion caused by insufficient levels of dissolved oxygen, and for aeration of water systems, the system assists in avoidance of the aquatic life disruption.

It will be yet further appreciated that the system of the present invention is comprised of commercially available and reasonably priced components, so as to result in a system that is reasonable in capital costs and in the costs associated with maintenance and repair. For example, controller 44 as illustrated herein is comprised of PLCs, an operator interface terminal, and alarm notification instrumentation available from more than one manufacturing source. Generally, controller 44 comprises at least one processor, such as the PLCs, microprocessor(s), or other combinations of hardware and/or software well known in the art. Controller 44 may also comprise data storage media (memory, RAM, hard disk, memory stick, or other devices well known in the art) for the storage of the entered volume, the parameters, and the tolerances for the parameters, and for retention of the operational data collected during operation of the system according to the present invention.

It will still further appreciated that, while various specific electronics are illustrated in FIG. 3A, FIG. 3B, FIG. 3C, FIG. 4, FIG. 5A, FIG. 5B, FIG. 5C, and FIG. 5D, various alternatives to such electronics that are well known in the art are contemplated to be within the scope of the invention. For example, in lieu, of or in concert with the use of PLCs, various combinations of hardware and/or software may serve the same function as set forth herein.

It will be yet further appreciated that the addition of a gas/chemical generation system, such as is illustrated in association with FIG. 6, results in a self-contained system requiring only that the initial material be made available to the generation system and that power be provided to the system. In the case of oxygen generation, no initial material is required to be provided as oxygen is generated from air. Thus, regardless of the gas and/or chemical to be introduced, the addition of the generation system reduces the costs associated with operation and limits the number of personnel required for operation of the system.

It will also be appreciated that it is possible to eliminate the requirement of the gas/chemical supply in the system of the present invention. Such elimination is conceivable if a readily available supply of the gas and/or chemical used to treat the fluid is available without storage. For example, when the system includes the generation system, if the generation system is able to produce the gas and/or chemical at rates equal to or greater than the demand for operation of the system, the gas/chemical supply would not be needed in such a system.

It will be further appreciated that variations may be made to the process of adjustments made for a parameter that is out of the specified tolerances and be within the scope of the invention. The examples given herein are based on a single measurement of parameters made after the adjustment has been made. This is a very tight system—one that can quickly result in the system being powered down. One may lengthen the time period the controller uses between the subsequent measurements to be more forgiving. Alternatively, a series of measurements may be made before the system is powered down. By making a series of measurements, the controller can ascertain whether the adjustment(s) made are in the process of resolving the out-of-bounds parameter, and, if such progress is determined to be in process, the controller may continue to make additional adjustment(s) or wait a longer period of time to see if the system and all parameters returns to a desired and/or safe operation. Various of these techniques, as well as others well known in the art, may be used for all parameters or for different parameters. For example, if pressure in the reactor exceeds a safe threshold, the system can be immediately powered down, but if other less critical parameters, such as a level of dissolved gas and/or chemical is slightly below the lower threshold, the controller could be "more patient" and allow for either a greater amount of time and/or make several measurements before determining it is necessary to power down the system.

As used in the claims, the term "treatment additive" refers to the gas and/or chemical to be added to the fluid. A treatment additive comprises at least one of a gas or chemical, and may comprise a combination of a gas and a chemical, a gas introduced to the reactor at one port and a chemical introduced to the reactor at another port, or any number of gases and/or chemicals introduced together and/or separately to the reactor. By use of this term, measurement related to the treatment additive may comprise separate measurements of each gas and/or chemical, and/or measurements of the combination of all gases and chemicals introduced into the reactor.

In view of the many possible embodiments to which the principles of these invention may be applied, it should be recognized that the detailed embodiments are illustrative only and should not be taken as limiting the scope of the invention. Rather, the invention comprises all such embodiments as may come within the scope and spirit of the invention and equivalents thereto.

We claim:

1. A system for treatment of a fluid with oxygen, the system comprising:

a reactor having a first inlet and an outlet;

a fluid line having first and second valves disposed therein;

a fluid inlet connected to the first valve and to the first inlet of the reactor, and wherein the first valve controls the flow of fluid into the first inlet of the reactor;

an oxygen inlet operatively connected to the reactor and to a supply of oxygen;

an oxygen valve within the oxygen inlet capable of controlling the flow of oxygen into the reactor;

a fluid outlet connected to the outlet of the reactor and to the second valve, and wherein the second valve controls the flow of treated fluid from the outlet of the reactor; and a controller operably connected to the oxygen valve, the controller capable of controlling the flow of oxygen through the oxygen valve into the reactor based on the fluid flow rate in the fluid line, the controller operable to measure the amount of dissolved oxygen present in the treated fluid exiting the reactor, and the controller further capable of modifying the amount of oxygen flowing into the reactor based on the measurement of said dissolved oxygen.

2. The system of claim 1, wherein the oxygen inlet is operably connected to the fluid inlet.

3. The system of claim 1, wherein the reactor further comprises a second inlet operably coupled to the oxygen inlet.

4. The system of claim 1, wherein the controller is operably connected to the first valve and the second valve, the controller capable of controlling the flow of fluid entering the reactor and the amount of treated fluid exiting the reactor through the outlet.

5. The system of claim 1, further comprising an oxygen generator operably connected to the supply of oxygen, the oxygen generator capable of generating oxygen from at least one ingredient.

6. A method for treating a fluid with oxygen, the method comprising the steps of:

providing a system including a reactor having a first inlet capable of receipt of an amount of the fluid and an outlet capable of release of fluid therefrom, a supply of oxygen operably connected to the reactor, and a controller operably connected to the first inlet and the outlet of the reactor introducing, under control of the controller, the fluid into the first inlet of the reactor and the oxygen into the reactor, wherein the amount of oxygen introduced is based on a rate of fluid flow;

measuring, with the controller, the amount of dissolved oxygen present in the treated fluid released from the reactor; and adjusting, under control of the controller, the amount of oxygen introduced into the reactor in response to the amount of dissolved oxygen measured as present in the treated fluid.

7. The method of claim 6, further comprises the step of controlling, with the controller, the flow of fluid entering the reactor and the amount of treated fluid exiting the reactor through the outlet.

8. The method of claim 6, further comprising the step of:

adjusting, under the control of the controller, the amount of fluid introduced into the first inlet of the reactor in response to the amount of dissolved oxygen measured as present in the treated fluid.

9. The method of claim 6, further comprising the step of:

adjusting, under control of the controller, the amount of fluid introduced into the first inlet of the reactor and the amount of oxygen introduced into the at least one second inlet of the reactor, both in response to the amount of oxygen measured as present in the treated fluid.

10. The method of claim 6, further comprising the step of:

establishing a desired range for flow of fluid into the reactor;

measuring with the controller the amount of fluid entering the reactor;

comparing with the controller the measured amount of fluid entering into the reactor to the desired range; and if the controller determines in the step of comparing the measured amount that the measured amount is outside the desired range, the controller adjusts the introduction of fluid into the reactor or adjusts the introduction of oxygen into the reactor.

11. The method of claim 6, wherein the system further comprises a pressure sensor for measuring the pressure within the reactor, the pressure sensor operably connected to the controller, the method further comprising the step of:

establishing the desired range pressure within the reactor;

measuring with the pressure sensor the pressure within the reactor;

comparing with the controller the measured pressure to the desired range; and if the controller determines in the step of comparing the measured pressure that the measured pressure is outside the desired range, the controller then adjusts the introduction of fluid into the reactor, adjusts the introduction of oxygen into the reactor, and/or adjusts the flow of treated fluid through the outlet.

12. The method of claim 6, wherein the system further comprises a fluid inlet operably connected to the first outlet, a pump located along the fluid inlet before the first inlet of the reactor for control of the flow of the fluid into the reactor, and a monitoring device located along the fluid inlet before the pump, the monitoring device capable of measuring the flow of fluid through the fluid inlet, and the pump and monitoring device operably connected to the controller, the method further comprising the steps of:

establishing the desired range for flow of fluid through the monitoring device;

measuring with the monitoring device the flow of fluid;

comparing with the controller the measured flow of fluid to the desire range; and if the controller determines in the comparing step that the measured flow of fluid is outside the desired range, adjusting with the pump the flow of fluid.

13. The method of claim 6, wherein the system further comprises a monitoring device capable of measuring the level of dissolved oxygen in the treated fluid, the monitoring device located outside the outlet of the reactor and operably connected to the controller, the method further comprising the steps of:

establishing the desired range for the level of dissolved oxygen in the treated fluid;

measuring with the monitoring device the level of dissolved oxygen in the treated fluid;

comparing with the controller the measured level of dissolved oxygen in the treated fluid to the desired range; and if the controller determines that the measured level of dissolved oxygen in the fluid is outside the desired range, the controller adjusts the amount of fluid entering the reactor through the first inlet, the amount of oxygen entering the reactor through the second inlet, and/or the amount treated fluid flowing from the reactor at the outlet.

14. A method for treating a fluid with oxygen, the method comprising the steps of:

providing a system including a reactor having a first inlet for receipt of an amount of the fluid, at least one second inlet for receipt of an amount of oxygen, and an outlet for release of an amount of treated fluid therefrom, at least one device for collection of data related to the operation of the system, a controller operably connected to the reactor at the first inlet, the at least one second inlet, and the outlet, the controller operably connected to the at least one device and including means for data storage of the data collected by the at least one device, the controller capable of controlling the amount of fluid entering the reactor, the amount of oxygen entering the reactor, and the amount of treated fluid released from the reactor based on a flow rate of fluid and/or oxygen, and a monitoring device capable of measuring the level of dissolved oxygen in the treated fluid, the monitoring device positioned within the reactor and operably connected to the controller;

operating the reactor with the controller; and collecting in the means for data storage of the controller data collected by the at least one device during operation of the reactor.

15. The method of claim 14, the method further comprising the steps of:

establishing the desired range for the level of dissolved oxygen in the treated fluid;

measuring with the monitoring device the level of dissolved oxygen in the treated fluid;

comparing with the controller the measured level of dissolved oxygen in the treated fluid to the desired range; and if the controller determines that the measured level of dissolved oxygen in the fluid is outside the desired range, the controller adjusts the amount of fluid entering the reactor through the first inlet, the amount of oxygen entering the reactor through the second inlet, and/or the amount treated fluid flowing from the reactor at the outlet.

* * * * *